(12) United States Patent
Batchelder et al.

(10) Patent No.: US 7,896,209 B2
(45) Date of Patent: Mar. 1, 2011

(54) FILAMENT DRIVE MECHANISM FOR USE IN EXTRUSION-BASED DIGITAL MANUFACTURING SYSTEMS

(75) Inventors: J. Samuel Batchelder, Somers, NY (US); William J. Swanson, St. Paul, MN (US)

(73) Assignee: Stratasys, Inc., Eden Prairie, MN (US)

( * ) Notice: Subject to any disclaimer, the term of this patent is extended or adjusted under 35 U.S.C. 154(b) by 272 days.

(21) Appl. No.: 12/150,667

(22) Filed: Apr. 30, 2008

(65) Prior Publication Data

US 2009/0274540 A1    Nov. 5, 2009

(51) Int. Cl.
- *B65H 20/00* (2006.01)
- *B65H 16/10* (2006.01)
- *B28B 1/14* (2006.01)

(52) U.S. Cl. .............. 226/53; 226/6; 226/76; 264/308; 242/564

(58) Field of Classification Search ......... 226/1, 226/4, 6, 53, 76, 170, 173, 188; 242/564, 242/564.3; 364/308; 29/248
See application file for complete search history.

(56) References Cited

U.S. PATENT DOCUMENTS

| | | | |
|---|---|---|---|
| 4,384,862 A | 5/1983 | Nakane | |
| 4,557,788 A | 12/1985 | Dana et al. | |
| 4,749,347 A | 6/1988 | Valavaara | |
| 5,121,329 A | 6/1992 | Crump | |
| 5,134,569 A | 7/1992 | Masters | |
| 5,303,141 A | 4/1994 | Batchelder et al. | |
| 5,312,224 A | 5/1994 | Batchelder et al. | |
| 5,340,433 A | 8/1994 | Crump | |
| 5,474,719 A | 12/1995 | Fan et al. | |
| 5,503,785 A | 4/1996 | Crump et al. | |
| 5,738,817 A | 4/1998 | Danforth et al. | |
| 5,764,521 A | 6/1998 | Batchelder et al. | |
| 5,779,793 A | 7/1998 | Sand | |
| 5,900,207 A | 5/1999 | Danforth et al. | |
| 5,939,008 A | 8/1999 | Comb et al. | |
| 5,968,561 A | 10/1999 | Batchelder et al. | |
| 6,004,124 A | 12/1999 | Swanson et al. | |
| 6,022,207 A | 2/2000 | Dahlin et al. | |
| 6,054,077 A | 4/2000 | Comb et al. | |
| 6,067,480 A | 5/2000 | Stuffle et al. | |
| 6,070,107 A | 5/2000 | Lombardi et al. | |
| 6,085,957 A | 7/2000 | Zinniel et al. | |
| 6,129,872 A | 10/2000 | Jang | |
| 6,214,279 B1 | 4/2001 | Yang et al. | |

(Continued)

OTHER PUBLICATIONS

International Search Report and Written Opinion of counterpart Application No. PCT/US09/01589 filed on Mar. 13, 2009.

*Primary Examiner*—Evan H Langdon
(74) *Attorney, Agent, or Firm*—Brian R. Morrison; Westman, Champlin & Kelly, P.A.

(57) ABSTRACT

A filament drive mechanism comprising a rotatable component comprising a central hole defined at least in part by an internally-threaded surface, and is configured to receive a filament strand through the central hole to engage the internally-threaded surface with the filament strand. The filament drive mechanism further comprises at least one rotation mechanism configured to rotate the rotatable component, thereby allowing the engaged internally-threaded surface to drive the filament strand through the central hole of the rotatable component.

20 Claims, 12 Drawing Sheets

U.S. PATENT DOCUMENTS

| | | |
|---|---|---|
| 6,238,613 B1 | 5/2001 | Batchelder et al. |
| 6,257,517 B1 | 7/2001 | Babish et al. |
| 6,547,995 B1 | 4/2003 | Comb |
| 6,578,596 B1 | 6/2003 | Batchelder et al. |
| 6,645,412 B2 | 11/2003 | Priedeman, Jr. et al. |
| 6,685,866 B2 | 2/2004 | Swanson et al. |
| 6,722,872 B1 | 4/2004 | Swanson et al. |
| 6,749,414 B1 | 6/2004 | Hanson et al. |
| 6,776,602 B2 | 8/2004 | Swanson et al. |
| 6,814,907 B1 | 11/2004 | Comb |
| 6,923,634 B2 | 8/2005 | Swanson et al. |
| 6,998,087 B1 | 2/2006 | Hanson et al. |
| 7,169,337 B2 * | 1/2007 | Swanson et al. .............. 264/39 |
| 7,172,715 B2 | 2/2007 | Swanson et al. |
| 7,625,200 B2 * | 12/2009 | Leavitt ....................... 425/375 |
| 2001/0030383 A1 * | 10/2001 | Swanson et al. ............. 264/308 |
| 2001/0038168 A1 * | 11/2001 | Popa et al. .................. 264/308 |
| 2003/0011103 A1 | 1/2003 | Swanson et al. |
| 2004/0129823 A1 * | 7/2004 | Swanson et al. ............. 242/563 |
| 2004/0217517 A1 * | 11/2004 | Swanson et al. ............. 264/308 |
| 2004/0245663 A1 * | 12/2004 | MacDougald et al. ......... 264/16 |
| 2005/0004282 A1 * | 1/2005 | Priedeman et al. .......... 524/115 |
| 2006/0078081 A1 | 4/2006 | Bilanin et al. |
| 2007/0228590 A1 | 10/2007 | LaBossiere et al. |
| 2009/0295032 A1 * | 12/2009 | Hopkins .................... 264/308 |

* cited by examiner

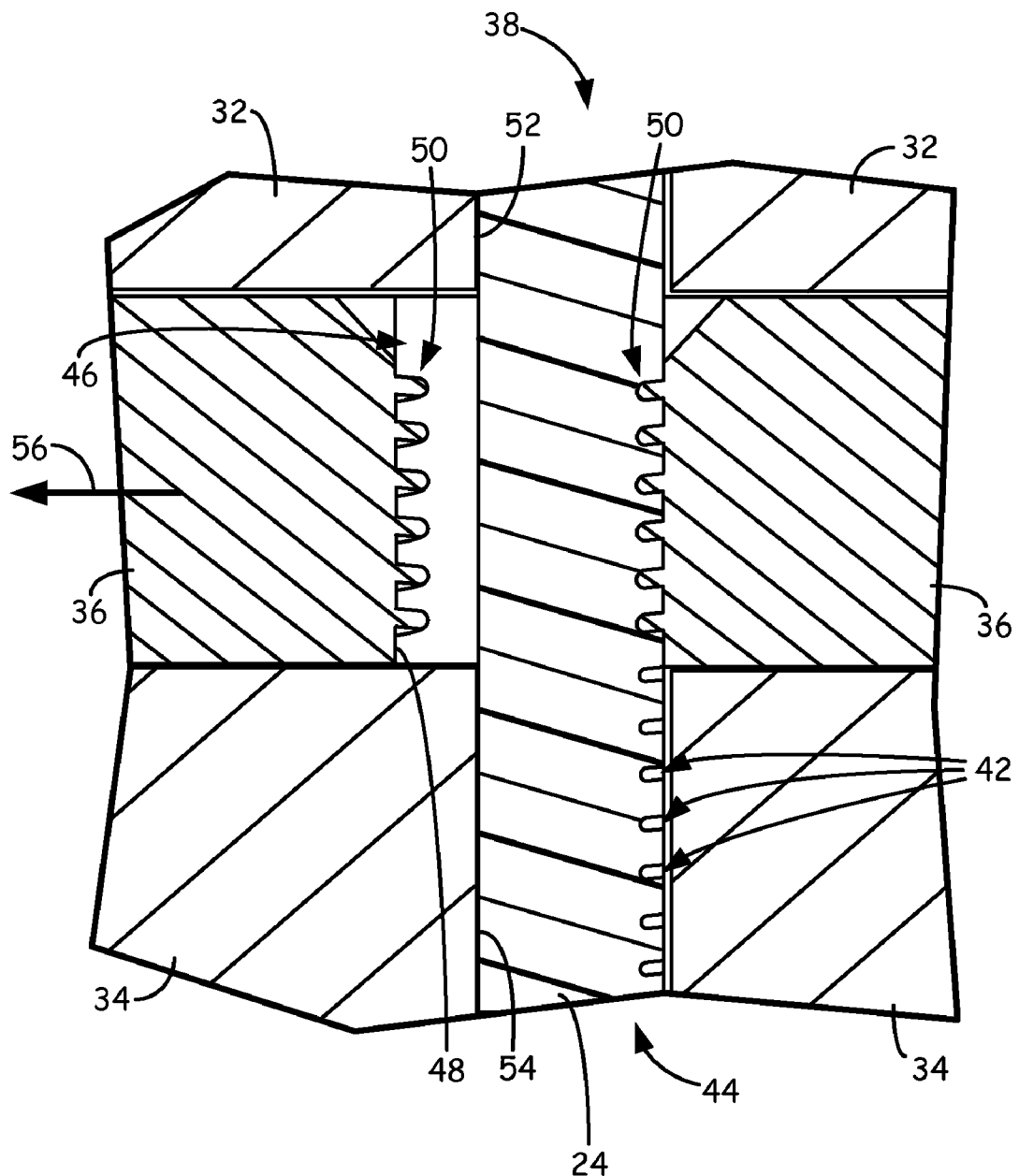
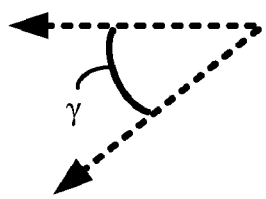
FIG. 4

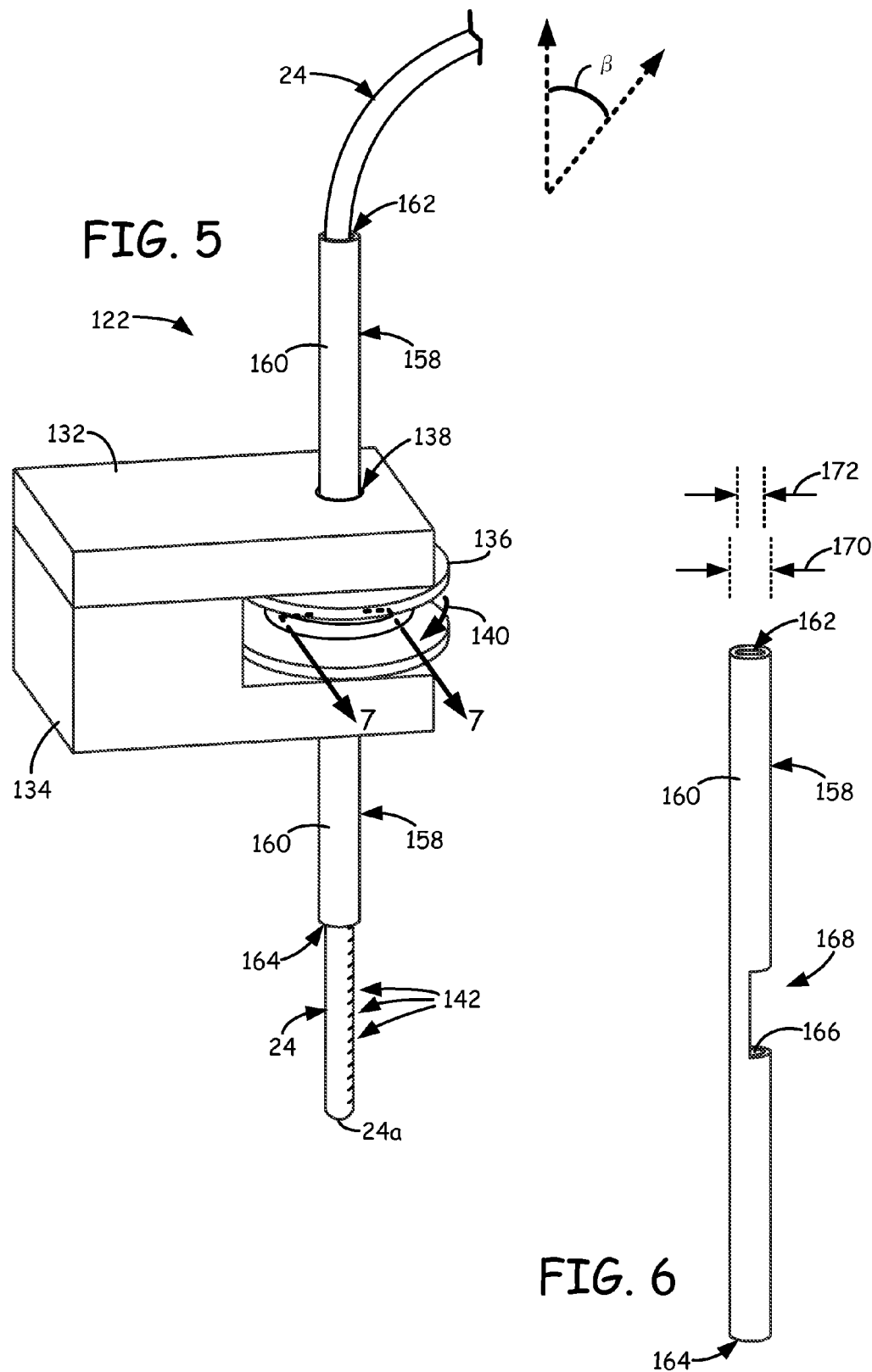

US 7,896,209 B2

FILAMENT DRIVE MECHANISM FOR USE IN EXTRUSION-BASED DIGITAL MANUFACTURING SYSTEMS

CROSS-REFERENCE TO RELATED APPLICATION(S)

Reference is hereby made to co-pending U.S. patent application Ser. No. 12/150,669, filed on even date, and entitled "Liquefier Assembly For Use In Extrusion-Based Digital Manufacturing Systems".

BACKGROUND

The present invention relates to digital manufacturing systems for building three-dimensional (3D) objects. In particular, the present invention relates to filament drive mechanisms for use in extrusion-based digital manufacturing systems.

An extrusion-based digital manufacturing system (e.g., fused deposition modeling systems developed by Stratasys, Inc., Eden Prairie, Minn.) is used to build a 3D object from a computer-aided design (CAD) model in a layer-by-layer manner by extruding a flowable build material. The build material is extruded through an extrusion tip carried by an extrusion head, and is deposited as a sequence of roads on a substrate in an x-y plane. The extruded build material fuses to previously deposited build material, and solidifies upon a drop in temperature. The position of the extrusion head relative to the substrate is then incremented along a z-axis (perpendicular to the x-y plane), and the process is then repeated to form a 3D object resembling the CAD model.

Movement of the extrusion head with respect to the substrate is performed under computer control, in accordance with build data that represents the 3D object. The build data is obtained by initially slicing the CAD model of the 3D object into multiple horizontally sliced layers. Then, for each sliced layer, the host computer generates a build path for depositing roads of build material to form the 3D object.

In fabricating 3D objects by depositing layers of build material, supporting layers or structures are typically built underneath overhanging portions or in cavities of objects under construction, which are not supported by the build material itself. A support structure may be built utilizing the same deposition techniques by which the build material is deposited. The host computer generates additional geometry acting as a support structure for the overhanging or free-space segments of the 3D object being formed. Support material is then deposited from a second nozzle pursuant to the generated geometry during the build process. The support material adheres to the build material during fabrication, and is removable from the completed 3D object when the build process is complete.

SUMMARY

The present invention relates to a filament drive mechanism, and a method of using the filament drive mechanism in an extrusion-based digital manufacturing system to build a 3D object. The filament drive mechanism includes a rotatable component having a central hole that is defined at least in part by an internally-threaded surface, where the rotatable component is configured to receive a filament strand through the central hole to engage the internally-threaded surface with the filament strand. The filament drive mechanism also includes at least one rotation mechanism for rotating the rotatable component, thereby allowing the engaged internally-threaded surface to drive the filament strand through the central hole of the rotatable component.

BRIEF DESCRIPTION OF THE DRAWINGS

FIG. 4 is a sectional view of section 4-4 taken in FIG. 2, which illustrates the filament strand engaged with an internally-threaded surface of a rotatable pulley of the filament drive mechanism.

FIG. 5 is a top perspective view of a first alternative filament drive mechanism, which incorporates a filament tube.

FIG. 6 is a top perspective view of the filament tube of the first alternative filament drive mechanism.

DETAILED DESCRIPTION

Figure 1:
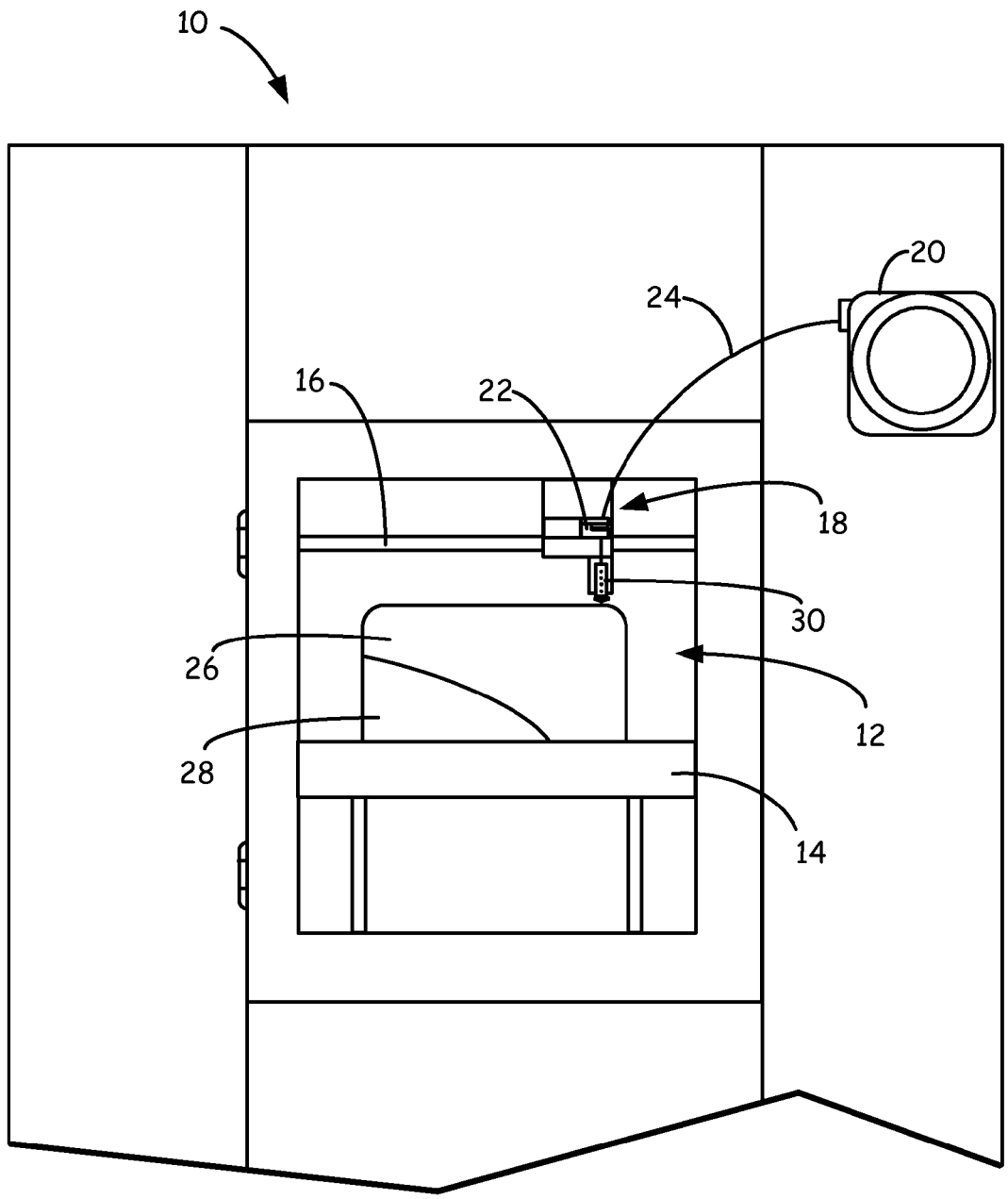
FIG. 1 is a front view of an extrusion-based digital manufacturing system that includes a filament drive mechanism.

FIG. 1 is a front view of system 10, which is an extrusion-based digital manufacturing system that includes build chamber 12, substrate 14, gantry 16, extrusion head 18, and filament supply source 20, where extrusion head 18 includes drive mechanism 22. As discussed below, drive mechanism 22 is a filament drive mechanism that uses a rotatable component having an internally-threaded surface (not shown in FIG. 1) for feeding successive portions of filament 24 from filament supply source 20 during a build operation with system 10. Suitable digital manufacturing systems for system 10 include fused deposition modeling systems developed by Stratasys, Inc., Eden Prairie, Minn. Build chamber 12 is an enclosed environment that contains substrate 14, gantry 16, and extrusion head 18 for building a 3D object (referred to as 3D object 26) and a corresponding support structure (referred to as support structure 28).

Substrate 14 is a platform on which 3D object 26 and support structure 28 are built, and moves along a vertical z-axis based on signals provided from a computer-operated controller (not shown). Gantry 16 is a guide rail system configured to move extrusion head 18 in a horizontal x-y plane within build chamber 12 based on signals provided from the computer-operated controller. The horizontal x-y plane is a plane defined by an x-axis and a y-axis (not shown in FIG. 1), where the x-axis, the y-axis, and the z-axis are orthogonal to each other. In an alternative embodiment, substrate 14 may be configured to move in the horizontal x-y plane within build chamber 12, and extrusion head 18 may be configured to move along the z-axis. Other similar arrangements may also be used such that one or both of substrate 14 and extrusion head 18 are moveable relative to each other.

Extrusion head 18 is supported by gantry 16 for building 3D object 26 and support structure 28 on substrate 14 in a layer-by-layer manner, based on signals provided from the computer-operated controller. In addition to drive mechanism 22, extrusion head 18 also includes liquefier 30 disposed below drive mechanism 22, where drive mechanism 22 feeds successive portions of filament 24 from filament supply source 20 to liquefier 30. Liquefier 30 is a thermal liquefier that melts the received portions of filament 24, thereby allowing the molten material to be extruded to build 3D object 26 or support structure 28. For ease of discussion, extrusion head 18 is shown in FIG. 1 with a single filament drive mechanism (i.e., drive mechanism 22) and a single liquefier (i.e., liquefier 30). However, extrusion head 18 may include multiple filament drive mechanisms and liquefiers for extruding multiple build and/or support materials.

Filament supply source 20 is a supply source (e.g., a spooled container) for filament 24, which is desirably retained at a remote location from build chamber 12. Filament 24 is a filament strand of a build or support material for building 3D object 26 or support structure 28, respectively. The dimensions of filament 24 may vary depending on the material of filament 24, and on the dimensions of drive mechanism 22. Examples of suitable average diameters for filament 24 range from about 1.143 millimeters (about 0.045 inches) to about 2.54 millimeters (about 0.100 inches). Suitable assemblies for filament supply source 20 and suitable filament strands for filament 24 are disclosed in Swanson et al., U.S. Pat. No. 6,923,634 and Comb et al., U.S. Pat. No. 7,122,246. While the materials of filament 24 are discussed herein as being build materials and support materials, suitable materials for use with extrusion head 18 include any type of extrudable material (e.g., thermoplastic materials).

During a build operation, gantry 16 moves extrusion head 18 around in the horizontal x-y plane within build chamber 12, and drive mechanism 22 is directed to feed successive portions of filament 24 from filament supply source 20 to liquefier 30. As shown, the feed pathway of filament 24 between filament supply source 20 and drive mechanism 22 is desirably curved. As such, filament 24 desirably enters drive mechanism 22 in a curved orientation. As discussed below, the curved orientation reduces the axial rotation of filament 24 as drive mechanism 22 feeds the successive portions of filament 24 to liquefier 30. The received portions of filament 24 are melted within liquefier 30, and the upstream, unmelted portions of filament 24 function as a piston to extrude the molten material out of extrusion head 18. Thus, drive mechanism 22 provides an efficient means for controlling the extrusion rate of the molten material from extrusion head 18. Examples of suitable extrusion rates from extrusion head 18 based on the drive rate of filament 24 from drive mechanism 22 include rates up to about 6,000 micro-cubic-inches/second (mics).

Figure 2:
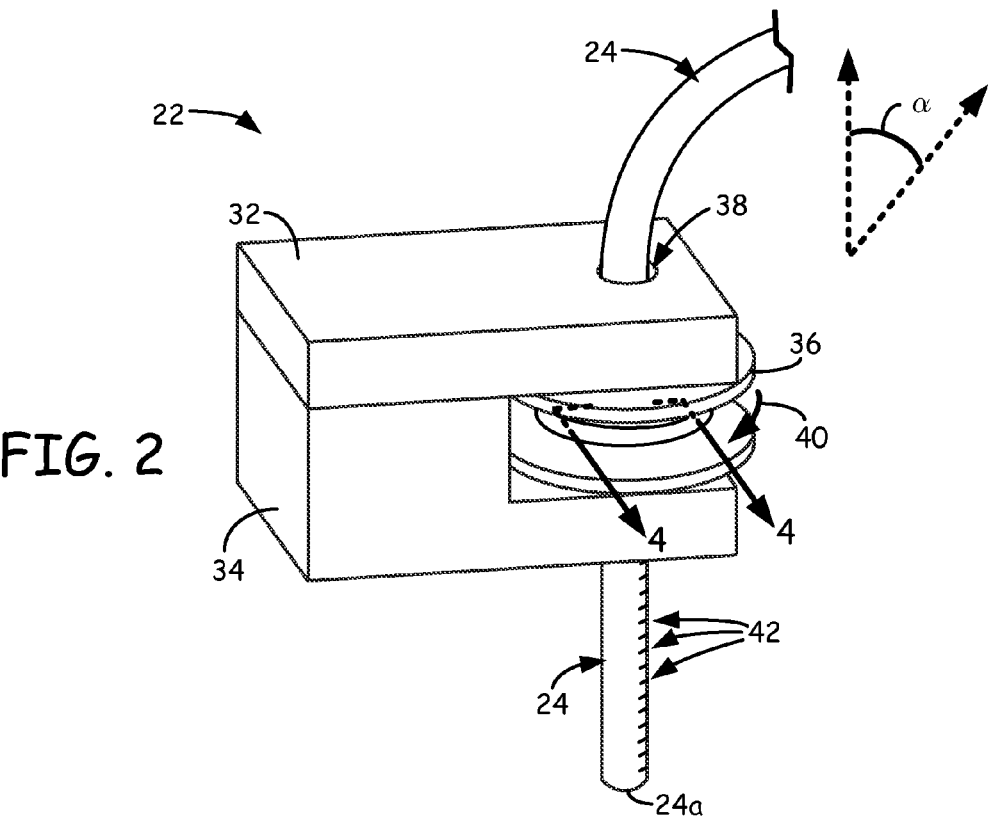
FIG. 2 is a top perspective view of the filament drive mechanism in use with a filament strand.

FIG. 2 is a top perspective view of drive mechanism 22 in use with filament 24. As shown, drive mechanism 22 includes support plate 32, base block 34, and pulley 36. Support plate 32 and base block 34 are support components of drive mechanism 22, and one or both of support plate 32 and base block 34 are desirably secured to extrusion head 18 (shown in FIG. 1). Support plate 32 includes inlet hole 38, which extends through support plate 32 to provide an inlet for filament 24. Support plate 32 and base block 34 are secured together such that pulley 36 is disposed between support plate 32 and base block 34. As discussed below, pulley 36 is a rotatable component that drives successive portions of filament 24 from filament source 20 (shown in FIG. 1) to liquefier 30 (shown in FIG. 1) with the use of an internally-threaded surface (not shown in FIG. 2).

In the embodiment shown in FIG. 2, pulley 36 is configured to be rotated by one or more rotation mechanisms (not shown) that provide torque to pulley 36. For example, a band/belt (not shown) may extend around pulley 36 and an external drive motor (not shown), thereby allowing the external drive motor to rotate pulley 36 (as represented by arrow 40). In alternative embodiments, pulley 36 may be replaced with a variety of different rotatable components that have internally-threaded surfaces, thereby allowing the alternative rotatable components to drive filament 24. For example, pulley 36 may be replaced with a rotatable gear that operably engages with one or more additional motor-driven gears (not shown) to drive filament 24. Examples of suitable rotatable gear configurations include spur, herringbone, bevel, sector, and combinations thereof. Alternatively, pulley 36 may be replaced with a friction-drive roller that operably engages with one or more additional motor-driven rollers (not shown) to drive filament 24. Furthermore, pulley 36 may be replaced with a rotatable component that is axially connected to a drive motor (not shown), thereby allowing the drive motor to directly rotate the rotatable component. For example, the rotatable component may be a threaded hollow shaft of a drive motor, where filament 24 is driven by the rotation of the threaded hollow shaft.

During a build operation in system 10 (shown in FIG. 1), filament 24 is loaded into filament drive 22 via inlet hole 38 such the tip of filament 24 (shown as tip 24a in FIG. 2) extends at least partially through pulley 36. FIG. 2 illustrates filament 24 extending completely through support plate 32, pulley 36, and base block 34 such that tip 24a extends below base block 34. As discussed above, filament 24 desirably enters inlet hole 38 in a curved orientation due the curved feed pathway between filament supply source 20 (shown in FIG. 1) and drive mechanism 22. Examples of suitable average angles "$\alpha$" for the curved orientation of filament 24 range from about 5 degrees to about 60 degrees, with particularly suitable average angles $\alpha$ ranging from about 10 degrees to about 30 degrees, where the average angle $\alpha$ is measured between the longitudinal axis of inlet hole 38 and a line that is tangent to the curvature of filament 24, and where the tangential line is taken at a point along filament 24 that is adjacent to support plate 32 and prior to entering inlet hole 38. As discussed below, the curved orientation of filament 24 reduces the axial rotation of filament 24 while passing through drive mechanism 22.

After filament 24 is loaded into drive mechanism 22, pulley 36 is rotated by a drive motor (not shown) based on signals provided from the computer-based controller (not shown). The rotation of pulley 36 correspondingly rotates the internally-threaded surface of pulley 36, which drives successive portions of filament 24 through drive mechanism 22 toward liquefier 30. The engagement between the internally-threaded surface of pulley 36 and filament 24 forms grooves 42 along the longitudinal length of filament 24. The formation of grooves 42 and the engagement of the internally-threaded surface of pulley 36 with grooves 42 allow drive mechanism 22 to drive the successive portions of filament 24 to liquefier 30.

Figure 3:
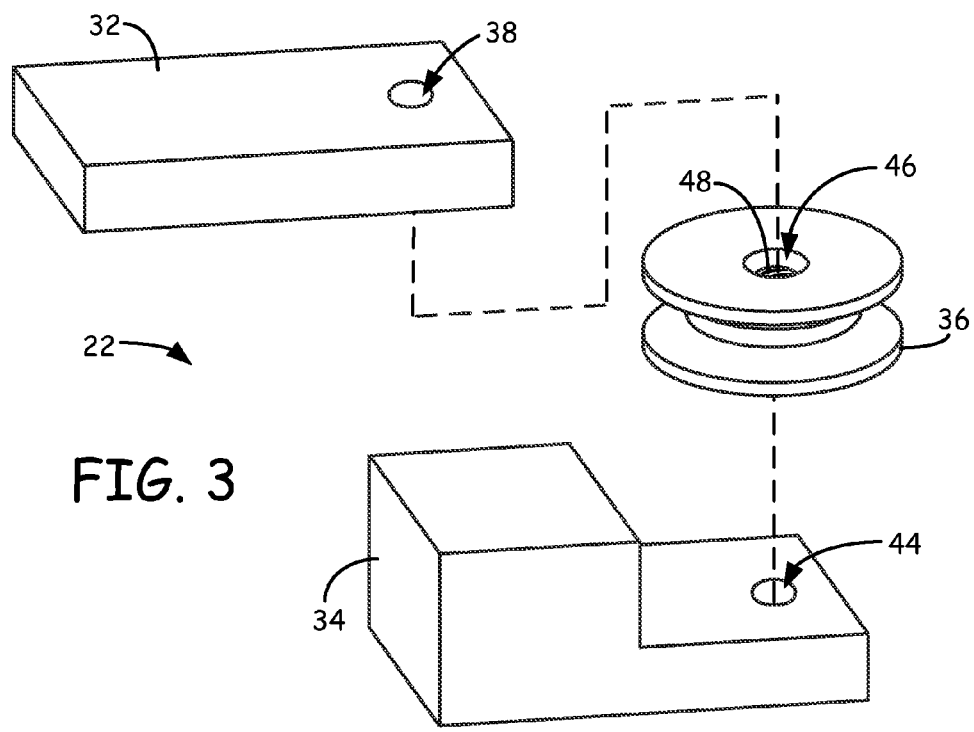
FIG. 3 is an exploded top perspective view of the filament drive mechanism.

FIG. 3 is an exploded top perspective view of drive mechanism 22. As shown, base block 34 includes outlet hole 44, which is an opening that extends through base block 34 for feeding filament 24 from pulley 36. As further shown, pulley 36 includes central hole 46, which is an axial opening through pulley 36 that is defined by inner surface 48. Inner surface 48 is the internally-threaded surface of pulley 36 that includes one or more helical threads that extend around central hole 46. As discussed below, while pulley 36 rotates, the helical thread(s) of inner surface 48 form grooves 42 in filament 24 (shown in FIG. 2) and engage with the formed grooves 42 to drive filament 24 through outlet hole 44 of base block 34.

FIG. 4 is a sectional view of section 4-4 taken in FIG. 2, further illustrating the engagement between filament 24 and inner surface 48. As shown, inner surface 48 includes thread segments 50, which are the segments of the helical thread(s) that extend around inner surface 48. In one embodiment, thread segments 50 are integrally formed with inner surface 48. In this embodiment, thread segments 50 may be formed during the fabrication of pulley 36 (e.g., with a sizing, pressing, and/or casting process), or may be formed in inner surface 48 after pulley 36 is fabricated (e.g., with a tapping process). In an alternative embodiment, thread segments 50 are provided as one or more separate components that are inserted into central hole 46, and are retained by pulley 36. For example, thread segments 50 may be provided as a helical coil or an internally-threaded shaft, which is inserted into central hole 46 and retained by pulley 36. The geometries of thread segments 50 may also vary depending on the desired contact with filament 24. For example, one or more of the inner lands of thread segments 50 may exhibit sharp pointed surfaces, smooth rounded surfaces, or variations between these geometries.

In one embodiment, thread segments 50 extend downward at a skewed angle relative to an axis that is normal to the surface of filament 24. The skewed angle further assists in the downward driving pressure applied to filament 24, and also further reduces the axial rotation of filament 24. Examples of suitable average angles γ for thread segments 50 relative to the normal of the surface of filament 24 range from about zero degrees (i.e., normal to the surface of filament 24) to about 60 degrees, with particularly suitable average angles γ ranging from about zero degrees to about 30 degrees.

As further shown in FIG. 4, support plate 32 includes backing surface 52, and base block 34 includes backing surface 54. Backing surfaces 52 and 54 are the lateral walls of inlet hole 38 and outlet hole 44, respectively, and provide lateral support to filament 24 when engaged with thread segments 50. This allows thread segments 50 to engage with filament 24 with sufficient pressure to form grooves 42 and drive filament 24 toward liquefier 30 (shown in FIG. 1). This also allows filament 24 to function as a substantially fixed axis for pulley 36. In alternative embodiments, support plate 32 and/or base block 34 may provide a substantially fixed axis for pulley 36. In another alternative embodiment, pulley 36 may be included a non-fixed axis, and may be biased in a direction of arrow 56 to increase the pressure of the engagement between filament 24 and thread segments 50. This embodiment provides compliance between filament 24 and inner surface 48 to compensate for changes in the diameter along the successive portions of filament 24.

When filament 24 is loaded into drive mechanism 22, pulley 36 is rotated to drive filament 24. The engagement between filament 24 and thread segments 50 allows thread segments 50 to impress grooves 42 in filament 24 while pulley 36 rotates. In one embodiment, the contact pressure between thread segments 50 and filament 24 is sufficient to thermoplastically form grooves 42. As discussed below, this reduces the amount of material flexing in filament 24, which correspondingly allows filament 24 to retain a substantially translucent appearance.

Furthermore, as discussed above, the curved orientation of filament 24 prior to entering inlet hole 38 of support plate 32 reduces the axial rotation of filament 24 while passing through drive mechanism 22. Additionally, back pressure applied from the molten material in liquefier 30 produces torque to counter rotate filament 24, thereby further reducing the axial rotation of filament 24. Drive mechanism 22 may also include anti-rotation components (e.g., counter-rotation nuts) (not shown) to further reduce the rotation of filament 24. The reduction in axial rotation of filament 24 allows thread segments 50 to mate with the formed grooves 42 to impel filament 24 downward through outlet hole 44 of base block 34. Thus, the rate of motion of filament 24 through drive mechanism 22 is controlled by the rate of rotation of pulley 36.

The contact between filament 24 and thread segments 50 also presses filament 24 against backing surfaces 52 and 54 in the direction of arrow 56. As a result, backing surfaces 52 and 54 function as lateral supports for filament 24 while engaged with thread segments 50, which allows thread segments 50 to remain engaged with filament 24. As successive portions of filament 24 are driven by the rotation of thread segments 50, additional grooves 42 are formed along filament 24 by thread segments 50. Thus, as filament 24 exits base block 34 at outlet hole 44, one side of filament 24 includes grooves 42 spaced apart along the longitudinal length of filament 24. Upon exiting base block 34, filament 24 then enters liquefier 30 to be melted and extruded from extrusion head 18 (shown in FIG. 1) to build 3D object 26 (shown in FIG. 1) and/or support structure 28 (shown in FIG. 1). Accordingly, the internally-threaded surface of drive mechanism 22 (i.e., inner surface 48) provides an effective means for driving filament 24 from filament supply source 20 to liquefier 30 during a build operation.

Figure 7:
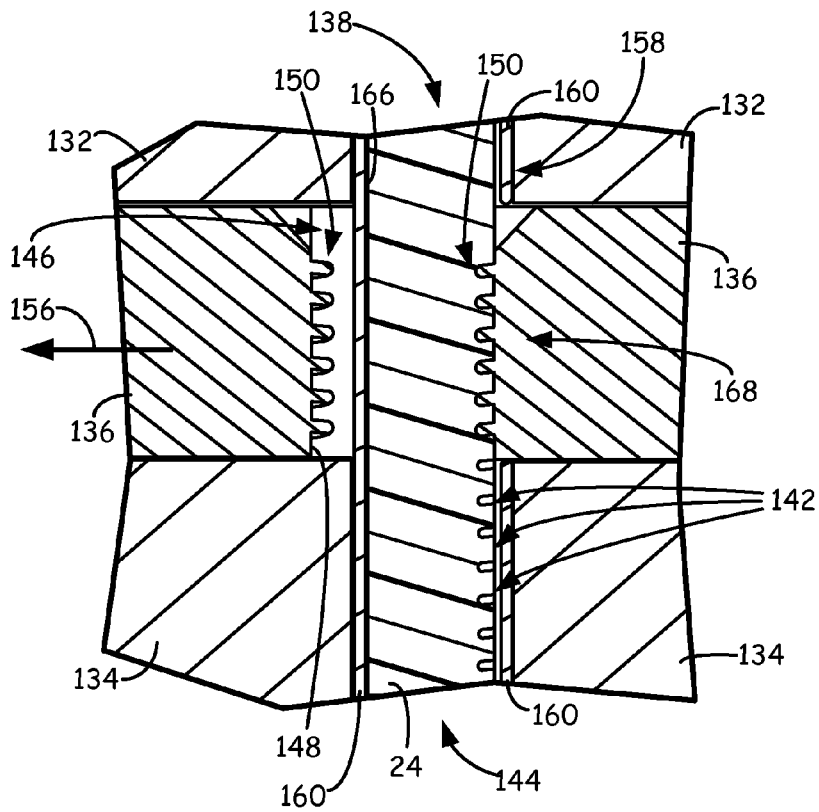
FIG. 7 is a sectional view of section 7-7 taken in FIG. 5, which illustrates the filament strand engaged with an internally-threaded surface of a rotatable pulley of the filament drive mechanism, within the filament tube.

FIGS. 5-7 illustrate drive mechanism 122, which is an alternative to drive mechanism 22 (shown in FIGS. 2-4) for use in system 10 (shown in FIG. 1), where the respective reference labels are increased by "100". FIG. 5 is a top perspective view of drive mechanism 122, which includes filament tube 158. As shown, filament tube 158 extends through tube hole 138 of support plate 132, central hole 146 (not shown) of pulley 136, and a tube hole (not shown) of base block 134. Filament tube 158 is a ported hollow tube that includes sidewall 160, inlet opening 162; and outlet opening 164. As used herein, the term "tube" includes a variety of hollow geometries that allow filament 24 to pass through, such as cylindrical geometries, elliptical geometries, polygonal geometries (e.g., rectangular and square geometries), axially-tapered geometries, and the like. Sidewall 160 is the circumferential, thin-wall portion of filament tube 158, and is desirably formed from a metallic material (e.g., stainless steel). Inlet opening 162 is an opening at a first end of sidewall 160, which is configured to receive filament 24 from filament supply source 20 (shown in FIG. 1). Outlet opening 164 is an opening at a second end of sidewall 160, and is configured to direct the exiting filament 24 toward liquefier 30 (shown in FIG. 1).

As discussed above, filament 24 desirably enters inlet opening 162 in a curved orientation due the curved feed pathway between filament supply source 20 (shown in FIG. 1) and drive mechanism 122. Examples of suitable average angles "β" for the curved orientation of filament 24 range from about 5 degrees to about 60 degrees, with particularly suitable average angles β ranging from about 10 degrees to about 30 degrees, where the average angle β is measured between the longitudinal axis of filament tube 158 and a line that is tangent to the curvature of filament 24, and where the tangential line is taken at a point along filament 24 that is adjacent to filament tube 158 and prior to entering inlet opening 162. As discussed below, the curved orientation of filament 24 reduces the axial rotation of filament 24 while passing through filament tube 158.

In one embodiment, liquefier 30 (shown in FIG. 1) is engaged with drive mechanism 22, as disclosed in U.S. Patent Application Publication No. 2009/0273122, entitled "Liquefier Assembly For Use In Extrusion-Based Digital Manufacturing Systems". In this embodiment, the liquefier tube of the liquefier assembly functions as filaments tube 158.

FIG. 6 is a perspective view of filament tube 158, which further includes interior surface 166 and port 168. Interior surface 166 of sidewall 160 is the surface of sidewall 160 that laterally supports filament 24 while filament 24 extends through filament tube 158. Interior surface 166 may include a low-surface energy coating to further reduce friction with filament 24. Suitable coating materials for interior surface 166 include fluorinated polymers (e.g., polytetrafluoroethenes, fluorinated ethylene propylenes, and perfluoroalkoxy polymers), diamond-like carbon materials, and combinations thereof.

The outer diameter of sidewall 160 (referred to as outer diameter 170) desirably allows filament tube 158 to be inserted through support plate 132 (shown in FIG. 5), pulley 136 (shown in FIG. 5), and base block 134 (shown in FIG. 5), and to be retained by one or both of support plate 132 and base block 134. The inner diameter of sidewall 160 (referred to as inner diameter 172) is defined by interior surface 166 and may vary depending on the average diameter of filament 24 (shown in FIG. 1), and desirably allows filament 24 to pass through filament tube 158 without excessive frictional resistance (e.g., about 5% to about 30% greater than the average diameter of filament 24). Examples of suitable average inner diameters for sidewall 160 range from about 1.78 millimeters (about 0.070 inches) to about 2.54 millimeters (about 0.100 inches), with particularly suitable average inner diameters ranges from about 2.03 millimeters (about 0.080 inches) to about 2.29 millimeters (about 0.090 inches). Examples of suitable average wall thicknesses for sidewall 260 (i.e., the difference between outer diameter 170 and inner diameter 172) range from about 0.127 millimeters (about 0.005 inches) to about 1.02 millimeters (about 0.040 inches), with particularly suitable average wall thicknesses ranging from about 0.254 millimeters (about 0.010 inches) to about 0.508 millimeters (about 0.020 inches).

Port 168 is an opening in sidewall 160 at a location between inlet opening 162 and outlet opening 164. As discussed below, port 168 allows the internally-threaded surface of pulley 136 (i.e., inner surface 148, not shown in FIG. 7) to engage with filament 24 (shown in FIG. 1) when filament 24 is loaded into filament tube 158. This allows the internally-threaded surface to drive filament 24 through filament tube 158 toward liquefier 30 (shown in FIG. 1). In the embodiment shown in FIG. 7, port 168 is disposed at a location that is centered between inlet opening 162 and outlet opening 164. In alternative embodiments, port 168 may be disposed at non-central locations along sidewall 160 between inlet opening 162 and outlet opening 164.

The dimensions of port 168 may vary depending on the dimensions of filament 24 and on the engagement with pulley 136. For example, the length of port 168 along the longitudinal length of sidewall 160 (referred to as length 168a) may vary depending on the dimensions of inner surface 148 of pulley 136 (not shown in FIG. 6). Examples of suitable lengths 168a for port 168 range from about 1.25 millimeters (about 0.05 inches) to about 25.0 millimeters (about 1.0 inch), with particularly suitable lengths 168a ranging from about 5.1 millimeters (about 0.2 inches) to about 12.7 millimeters (about 0.5 inches). Furthermore, the angle of the radial opening of port 168, as taken from a cross section of sidewall 38 that is normal to the longitudinal length of sidewall 160, may also vary depending on the engagement between inner surface 148 and filament 24. Examples of suitable angles for the radial opening of port 168 range from about 90 degrees to about 180 degrees, with particularly suitable angles ranging from about 130 degrees to about 160 degrees.

FIG. 7 is a sectional view of section 7-7 taken in FIG. 5, further illustrating the engagement between filament 24 and inner surface 148 at port 168. As shown, thread segments 150 of inner surface 148 extend through port 168 to engage with filament 24 in the same manner as discussed above for drive mechanism 22. As further shown, interior surface 166 of sidewall 160 provides lateral support to filament 24 when engaged with thread segments 150. This allows thread segments 150 to engage with filament 24 with sufficient pressure to form grooves 142 and drive filament 24 toward liquefier 30 (shown in FIG. 1). This also allows filament 24 to function as a substantially fixed axis for pulley 136. In alternative embodiments, support plate 132, base block 134, and/or filament tube 158 may provide a substantially fixed axis for pulley 136. In another alternative embodiment, pulley 136 is biased in a direction of arrow 156 to increase the pressure of the engagement between filament 24 and thread segments 150.

As discussed above for drive mechanism 22, the engagement between filament 24 and thread segments 150 allows thread segments 150 to impress grooves 142 in filament 24 while pulley 136 rotates. The contact between filament 24 and thread segments 150 presses filament 24 against interior surface 166 in the direction of arrow 526. As a result, interior surface 166 functions as a lateral support for filament 24 while engaged with thread segments 150, which allows thread segments 150 to remain engaged with filament 24. As successive portions of filament 24 are driven by the rotation of thread segments 150, additional grooves 142 are formed along filament 24 by thread segments 150. Thus, as filament 24 exits base block 134 at tube hole 144, one side of filament 24 includes grooves 142 spaced apart along the longitudinal length of filament 24. Upon exiting filament tube 158, filament 24 then enters liquefier 30 to be melted and extruded from extrusion head 18 (shown in FIG. 1) to build 3D object 26 (shown in FIG. 1) and/or support structure 28 (shown in FIG. 1). Accordingly, the internally-threaded surface of drive mechanism 22 (i.e., inner surface 48) provides an effective means for driving filament 24 from filament supply source 20 to liquefier 30 during a build operation.

Figure 8:
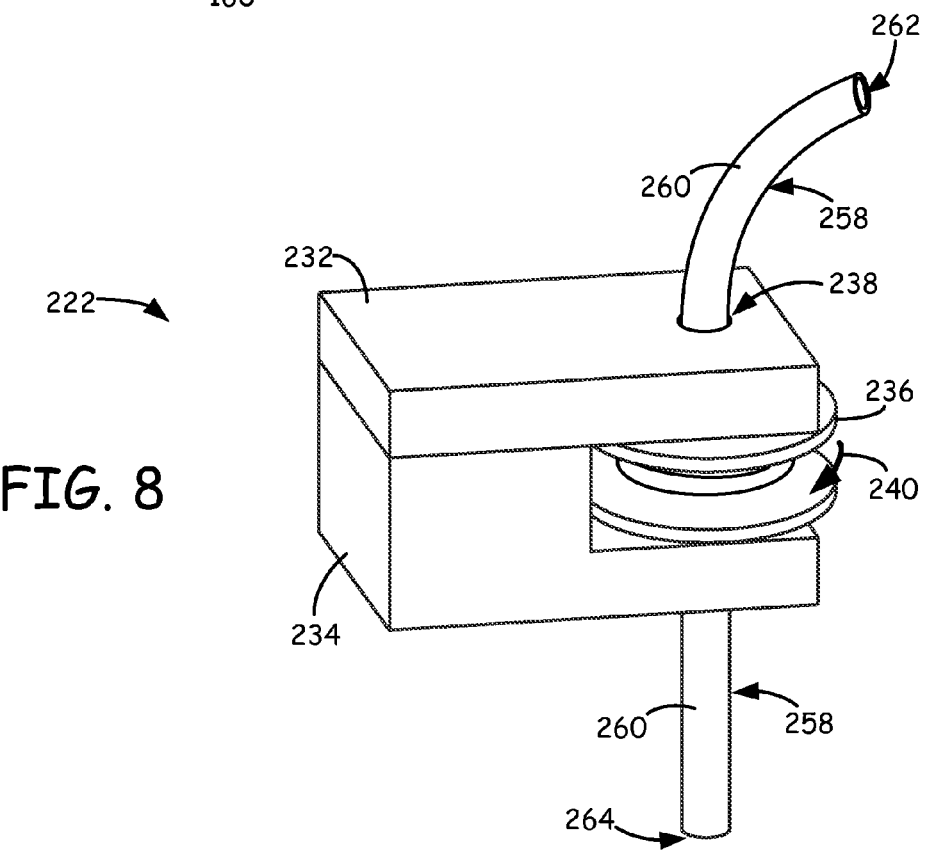
FIG. 8 is a top perspective view of a second alternative filament drive mechanism, which incorporates a curved filament tube.

FIG. 8 is a top perspective view of drive mechanisms 222, which is an alternative to drive mechanism 122 (shown in FIGS. 5-7), where the corresponding reference labels are increased by "100". As shown in FIG. 8, drive mechanism 222 is similar to drive mechanism 222, and operates in the same manner, with the exception that the portion of filament tube 258 located above support plate 232 has a curved geometry. Examples of suitable average angles for the curved geometry of filament tube 258 include those for average angles "β" discussed above for filament 24. The feed pathway of filament 24 (shown in FIG. 1) between filament supply source 20 (shown in FIG. 1) and drive mechanism 222 is desirably curved. This allows filament 24 to enter drive mechanism 222 with a curved orientation. The curved geometry of filament tube 258 assists in maintaining the curved orientation of filament 24 prior to engaging with the internally-threaded surface (not shown) of pulley 236. This reduces the axial rotation of filament 24 as drive mechanism 222 feeds the successive portions of filament 24 to liquefier 30 (shown in FIG. 1).

Figure 9:
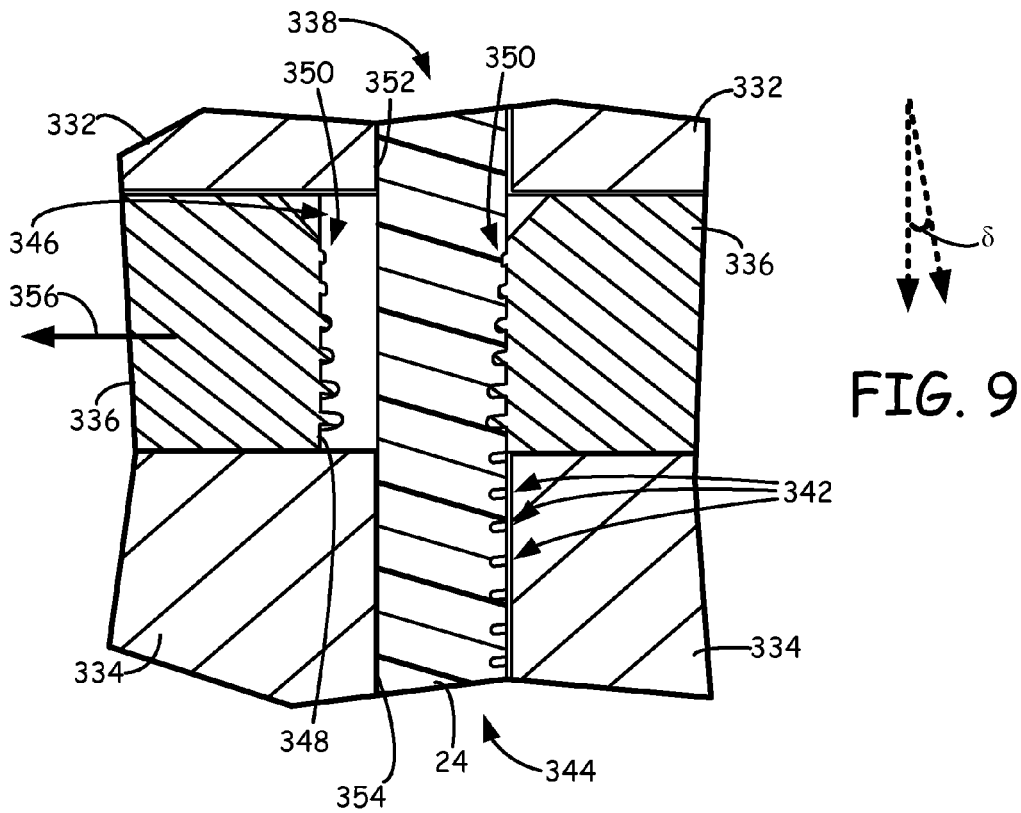
FIG. 9 is a sectional view of an engagement between the filament strand and an internally-threaded surface of a rotatable pulley of a third alternative filament drive mechanism, where the internally-threaded surface includes tapered thread segments.

FIG. 9 is a sectional view of an engagement between filament 24 and inner surface 348 of drive mechanism 322, where drive mechanisms 322 is a second alternative to drive mechanism 22 (shown in FIGS. 2-4), and the corresponding reference labels are increased by "300". As shown in FIG. 9, inner surface 348 includes thread segments 350, where thread segments 350 are tapered such that the dimensions of thread segments 350 adjacent outlet hole 344 are greater than the dimensions of thread segments 350 adjacent inlet hole 338. Examples of suitable tapered angles "δ" relative to inner surface 348 for thread segments 250 include angles up to about 30 degrees, with particularly suitable angles δ relative to inner surface 348 ranging from about zero degrees to about 15 degrees. The tapered dimensions of thread segments 350 allows grooves 342 to form over several rotations of pulley 336, thereby reducing the stresses on filament 24.

Figure 10:
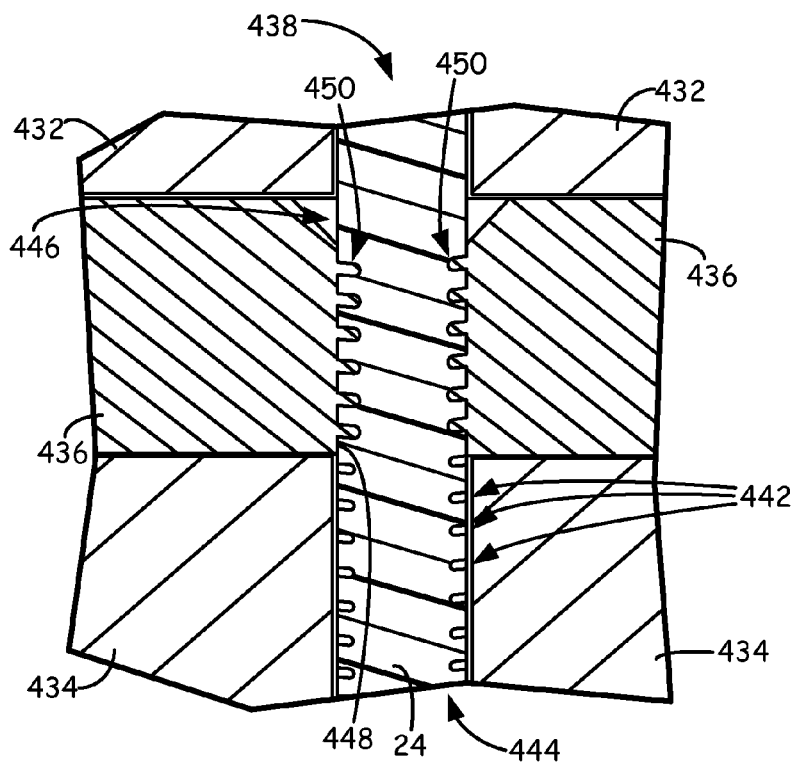
FIG. 10 is a sectional view of an engagement between the filament strand and an internally-threaded surface of a rotatable pulley of a fourth alternative filament drive mechanism, where the internally-threaded surface engages the filament strand substantially around the perimeter of the filament strand.

FIG. 10 is a sectional view of an engagement between filament 24 and inner surface 448 of drive mechanism 422, where drive mechanisms 422 is a third alternative to drive mechanism 22 (shown in FIGS. 2-4), and the corresponding reference labels are increased by "400". As shown in FIG. 10, inner surface 448 includes thread segments 450, where thread segments 450 engage with filament 24 substantially around the entire perimeter of filament 24. This desirably forms grooves 442 around the entire perimeter of filament 24 for driving filament 24 toward liquefier 30 (shown in FIG. 1). Engaging thread segments 450 substantially around the entire perimeter of filament 24 allows the contact pressure between thread segments 450 and filament 24 to be reduced (e.g., for use with softer materials for filament 24), while also allowing filament 24 to be readily driven by the rotation of pulley 436.

Figure 11:
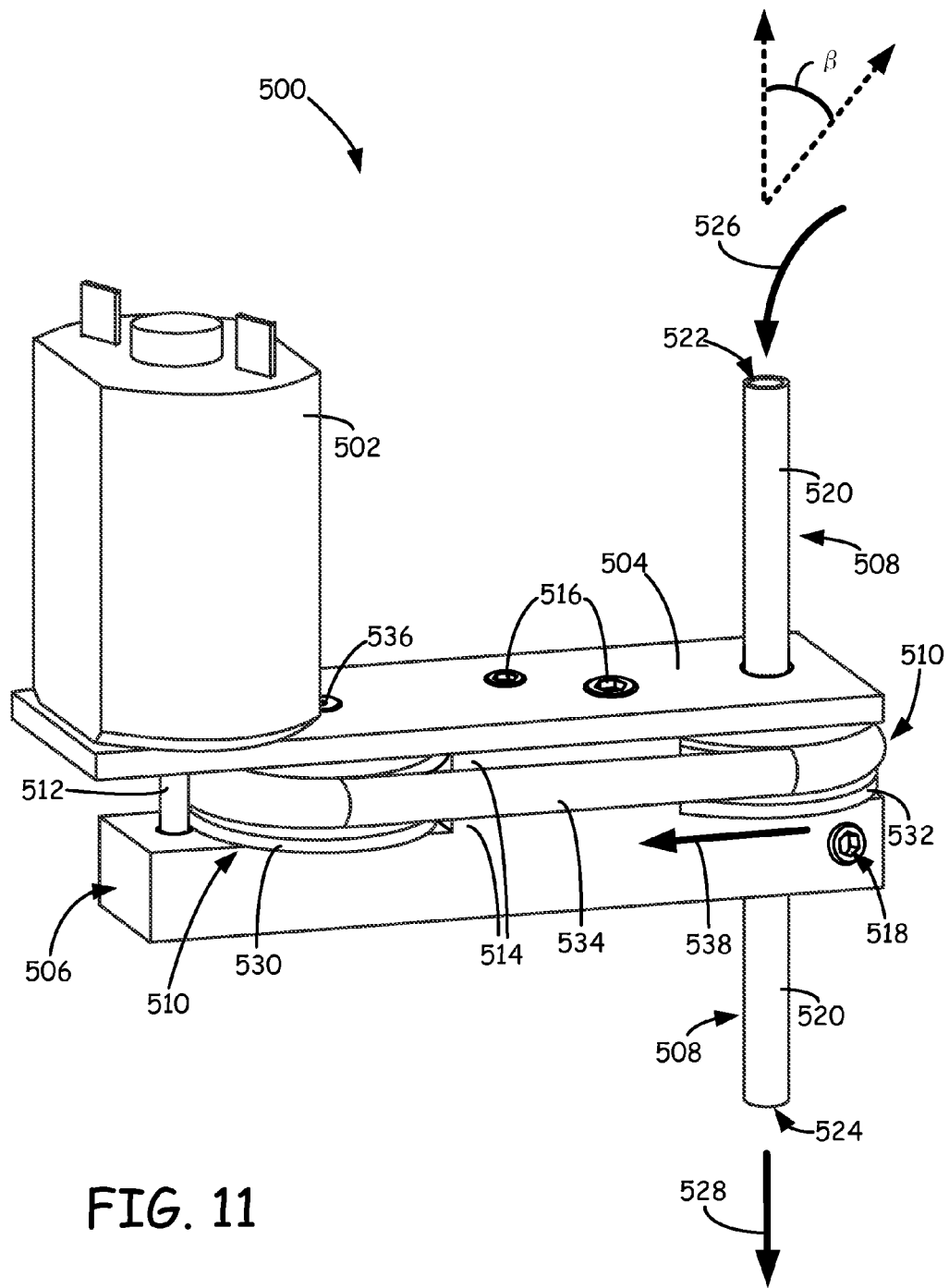
FIG. 11 is a top perspective view of a fifth alternative filament drive mechanism, which illustrates a biased rotatable component.
Figure 12:
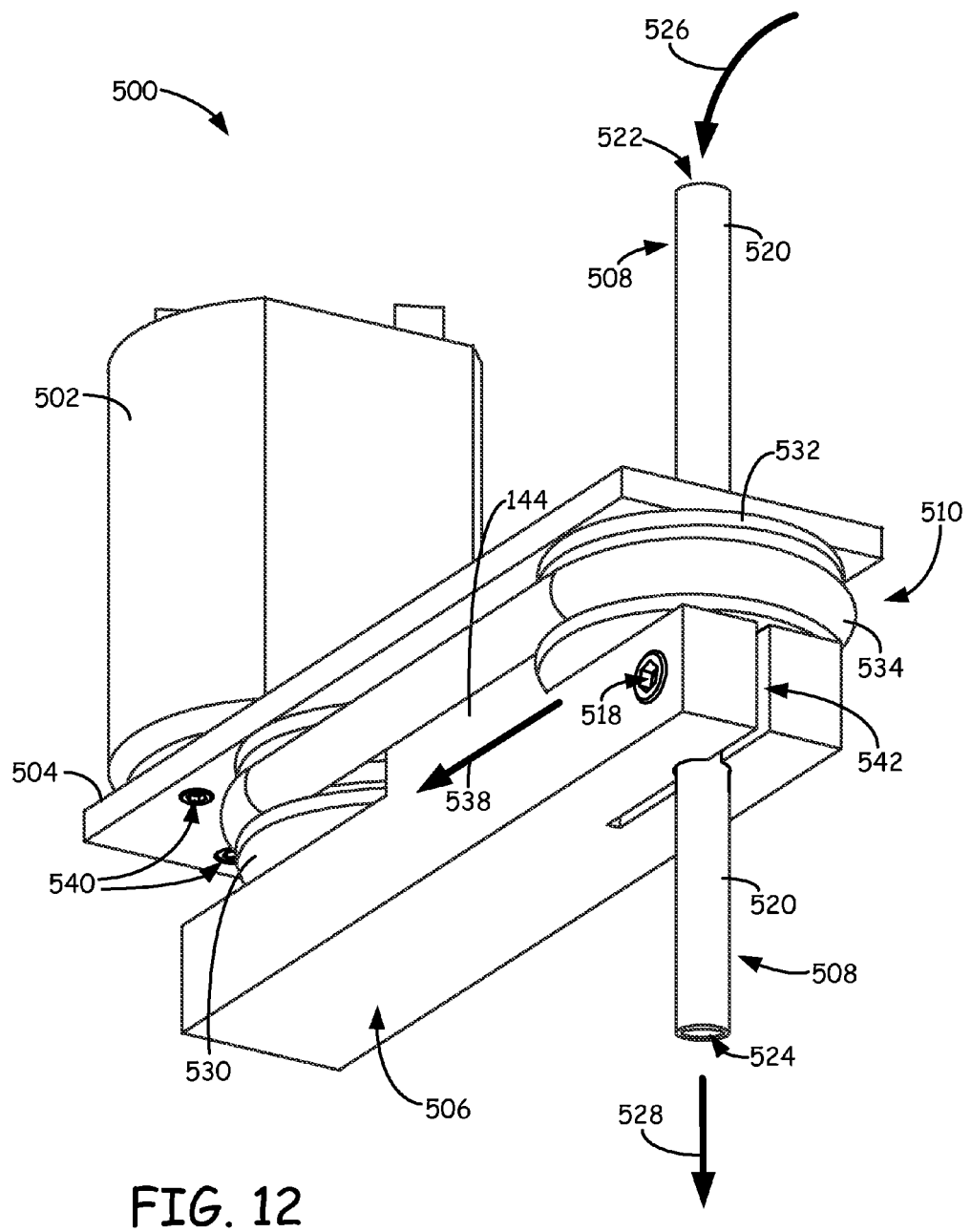
FIG. 12 is a bottom perspective view of the fifth alternative filament drive mechanism.

FIGS. 11 and 12 are top and bottom perspective views, respectively, of drive mechanism 500, which is a fifth alternative to drive mechanism 22 (shown in FIGS. 2-4) for use in system 10 (shown in FIG. 1). Drive mechanism 500 illustrates the use of a biased engagement for driving filament 24 (shown in FIG. 1) from filament supply source 20 (shown in FIG. 1) to liquefier 30 (shown in FIG. 1). As shown in FIG. 11, drive mechanism 500 includes drive motor 502, support plate 504, clamp block 506, filament tube 508, and pulley assembly 510. Drive motor 502 is a motor (e.g., a direct current motor) secured to support plate 504, and includes drive shaft 512. Drive shaft 512 extends through support plate 504 and into clamp block 506, and is configured to relay rotational power of drive motor 502 to pulley assembly 510. Drive motor 502 also includes electrical connections (not shown) for receiving electrical power and control signals from the computer-operated controller of system 10 (not shown).

Support plate 504 and clamp block 506 are support components of drive mechanism 500, and one or both of support plate 504 and clamp block 506 are desirably secured to extrusion head 18 (shown in FIG. 1). Clamp block 506 is a base block that includes spacer portion 514, where spacer portion 514 is an extended portion of clamp block 506 for securing support plate 504 to clamp block 506 with the use of bolts 516. Spacer portion 514 also functions as an offsetting spacer for pulley assembly 510. Clamp block 506 also retains tension bolt 518, which extends laterally into clamp block 506, and allows clamp block 506 to tighten and loosen around filament tube 508. This allows multiple filament tubes (e.g., filament tube 508) to be interchangeably inserted into, and removed from, clamp block 506.

Filament tube 508 is the same as filament tube 158 (shown in FIGS. 5-7), and extends through support plate 504, pulley assembly 510, and clamp block 506. Filament tube 508 includes sidewall 520, inlet opening 522, and outlet opening 524, where sidewall 520 is the circumferential, thin-wall portion of filament tube 508, and is desirably formed from a metallic material (e.g., stainless steel). Inlet opening 522 is an opening at a first end of sidewall 520, which is configured to receive filament 24 (shown in FIG. 1) from filament supply source 20 (shown in FIG. 1), as represented by arrow 526. Outlet opening 524 is an opening at a second end of sidewall 520, and is configured to direct the exiting filament 24 toward liquefier 30 (shown in FIG. 1), as represented by arrow 528.

The outer diameter of sidewall 520 desirably allows filament tube 508 to be inserted through support plate 504, pulley assembly 510, and clamp block 506, and to be retained by clamp block 506 when tightened with tension bolt 518. The inner diameter of sidewall 520 may vary depending on the average diameter of filament 24 (shown in FIG. 1), and desirably allows filament 24 to pass through filament tube 508 without excessive frictional resistance (e.g., about 20% to about 30% greater than the average diameter of filament 24). Examples of suitable average inner diameters for sidewall 520 include those discussed above for filament tube 158. The inner surface of sidewall 520 may also include a low-surface energy coating to further reduce friction with filament 24. Suitable coating materials for the inner surface of sidewall 520 include those discussed above for filament tube 158.

Pulley assembly 510 includes idler pulley 530, biased pulley 532, and band 534. Idler pulley 530 is a first rotatable pulley that is secured between support plate 504 and clamp block 506, and has a fixed rotational axis around pin 536. Biased pulley 532 is a second rotatable pulley that is secured between support plate 504 and clamp block 506 on the opposing side of spacer portion 514 from idler pulley 530. As discussed below, biased pulley 532 has a non-fixed rotational axis that extends around filament tube 508, and is the component of drive mechanism 500 that retains a helical coil (not shown in FIG. 11) for feeding successive portions of filament 24 to liquefier 30.

Band 534 extends around idler pulley 530 and biased pulley 532, thereby entrapping spacer portion 514 between idler pulley 530 and biased pulley 532. Band 534 is desirably formed from one or more elastomeric materials (e.g., a rubber o-ring), and is placed in a stretched state when wrapped around idler pulley 530 and biased pulley 532. This induces a biasing force on biased pulley 532, thereby pulling biased pulley 532 toward spacer portion 514 and idler pulley 530, as represented by arrow 538.

As further shown in FIG. 11, drive shaft 512 presses band 534 against idler pulley 530. This engagement between drive shaft 512 and band 534 allows drive shaft 512 to relay the rotational power of drive motor 502 to band 534, thereby allowing band 534 to correspondingly rotate idler pulley 530 and biased pulley 532 during operation. In an alternative embodiment, drive shaft 512 is axially secured to idler pulley 530, thereby allowing drive motor 502 to directly rotate idler pulley 530. In this embodiment, idler pulley 530 rotates band 534, which correspondingly rotates biased pulley 532.

As shown in FIG. 12, drive motor 502 is secured to support plate 504 with the use of bolts 540. Additionally, clamp block 506 further includes slot 542, which extends longitudinally into clamp block 506 and has adjustable dimensions based on the level of tension applied by tension bolt 518. As such, tension bolt 518 may be loosened or removed to reduce the tension on slot 542, thereby allowing filament tube 508 to be removed from clamp block 506 for cleaning or replacement. When filament tube 508 is inserted within clamp block 506, tension bolt 518 may be tightened, which increases the tension on slot 542 to securely retain filament tube 508 within clamp block 506.

During a build operation in system 10 (shown in FIG. 1), filament 24 (shown in FIG. 1) is loaded into filament tube 508 at inlet opening 522. As discussed above, filament 24 desirably enters inlet opening 522 in a curved orientation due the curved feed pathway between filament supply source 20 (shown in FIG. 1) and drive mechanism 500. Examples of suitable average angles "β" for the curved orientation of filament 24 include those discussed above for drive mechanism 122 (shown in FIG. 5). After filament 24 is loaded into filament tube 508, drive motor 502 and drive shaft 512 (shown in FIG. 11) then rotate band 534 based on signals provided from the computer-based controller (not shown). This correspondingly rotates idler pulley 530 and biased pulley 532. The rotation of biased pulley 532 rotates the helical coil (not shown in FIG. 12) retained by biased pulley 532, which drives successive portions of filament 24 through filament tube 508, and out of outlet opening 524 toward liquefier 30 (shown in FIG. 1). Accordingly, drive motor 502 dictates the feed rate of filament 24 to liquefier 30 by controlling the rotational power applied to biased pulley 532.

Figure 13:
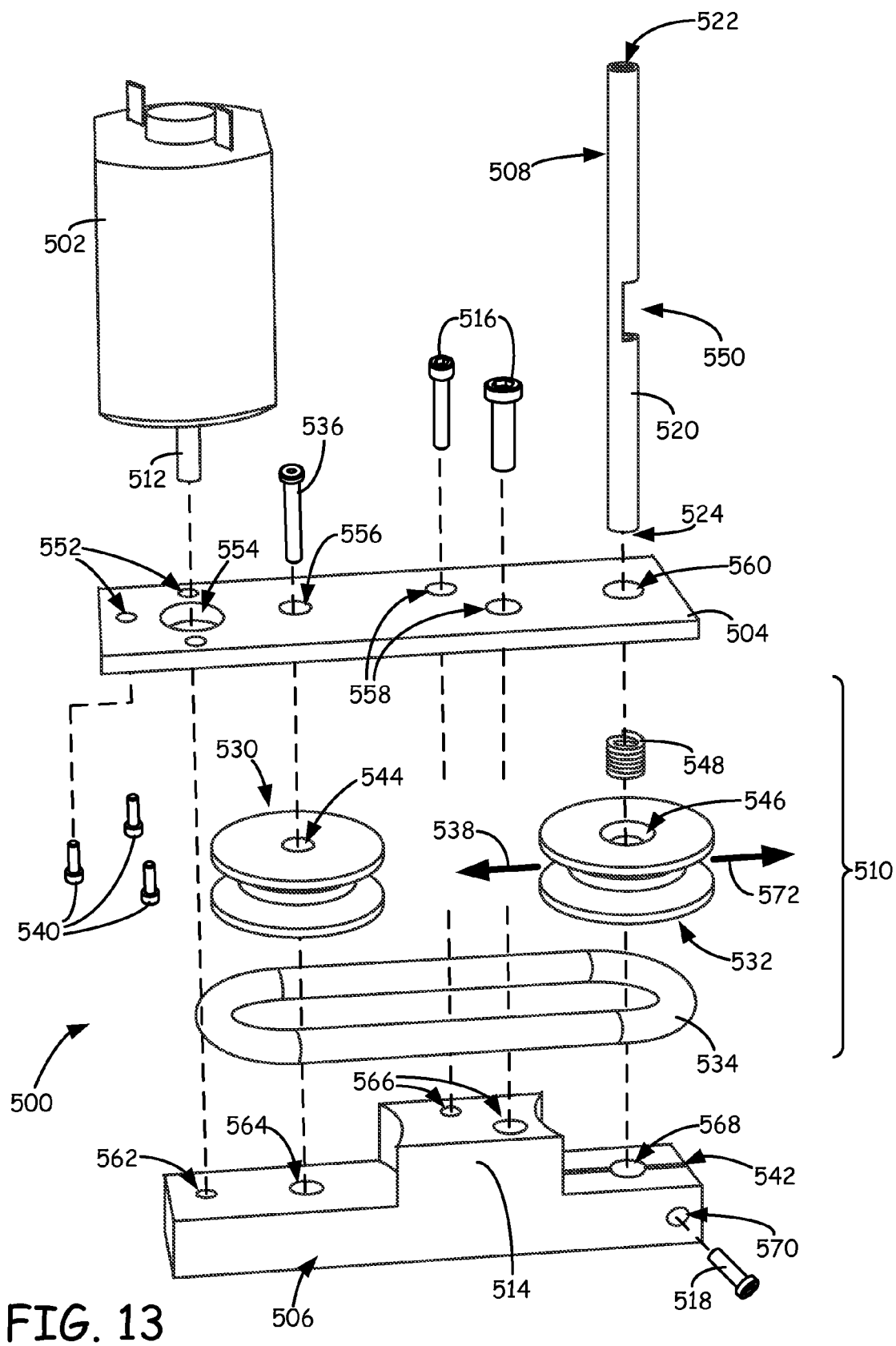
FIG. 13 is an exploded top perspective view of the fifth alternative filament drive mechanism.

FIG. 13 is an exploded top perspective view of drive mechanism 500. As shown, idler pulley 530 includes central hole 544, and biased pulley 532 includes central hole 546, where central holes 544 and 546 define the central axes of idler pulley 530 and biased pulley 532, respectively. As further shown, central hole 546 of biased pulley 532 has a larger diameter than central hole 544 of idler pulley 530. The enlarged diameter of central hole 546 provides a non-fixed rotational axis for biased pulley 532, which allows biased pulley 532 to have a limited range of movement.

Pulley assembly 510 also includes helicoil 548, which is a helical coil that is inserted into central hole 546 of biased pulley 532. The dimensions of helicoil 548 may vary depending on the dimensions of filament 24, filament tube 508, and central hole 546. Examples of suitable dimensions for helicoil 548 include an average inner diameter ranging from about 2.03 millimeters (about 0.080 inches) to about 2.29 millimeters (about 0.090 inches), an average coil diameter (i.e., the diameter of the coiled wire) ranging from about 0.25 millimeters (about 0.010 inches) to about 0.51 millimeters (about 0.020 inches), and a thread pitch (i.e., number of coiled wire segments per inch) ranging from about 30 to about 50.

Filament tube 508 includes port 550, which is an opening in sidewall 520 at a location between inlet opening 522 and outlet opening 524. As discussed below, port 550 allows helicoil 548 to engage with filament 24 (shown in FIG. 1) when filament 24 is loaded into filament tube 508. This allows helicoil 548 to drive filament 24 through filament tube 508 toward liquefier 30 (shown in FIG. 1). In the embodiment shown in FIG. 13, port 550 is disposed at a location that is centered between inlet opening 522 and outlet opening 524. In alternative embodiments, port 550 may be disposed at non-central locations along sidewall 520 between inlet opening 522 and outlet opening 524.

As further shown from left-to-right in FIG. 13, support plate 504 includes bolt holes 552, shaft opening 554, pin hole 556, bolt holes 558, and tube hole 560. Similarly, clamp block 506 includes shaft hole 562, pin hole 564, bolt holes 566, tube hole 568, and slot tension hole 570. During the assembly of drive mechanism 500, drive motor 502 is secured to support plate 504 with the use of bolts 540 at bolt holes 552. This arrangement extends drive shaft 512 through shaft opening 554. With respect to pulley assembly 510, helicoil 548 is secured within central hole 546 of biased pulley 532, thereby allowing rotation of biased pulley 532 to correspondingly rotate helicoil 548. Helicoil 548 may be secured within central hole 546 using a variety of techniques, such as frictional fitting, adhesive bonds, and combinations thereof. One or more washers (not shown) may also be positioned at one or both axial ends of helicoil 548 to assist in the operation of pulley assembly 510.

Band 534 is wrapped around idler pulley 530 and biased pulley 532, and idler pulley 530 and biased pulley 532 are then pulled apart and positioned on the opposing sides of spacer portion 514. The arched walls of spacer portion 514 allow idler pulley 530 and biased pulley 532 to be retained by clamp block 506 during assembly, despite being biased toward each other. Support plate 504 may then be positioned over pulley assembly 510 and spacer portion 514, which inserts drive shaft 512 into shaft hole 562 of clamp block 506, and presses drive shaft 512 against band 534. Pin 536 may then be inserted through pin hole 556 of support plate 504, through central hole 544 of idler pulley 530, and into pin hole 564 of clamp block 506. This allows pin 536 to function as a fixed axis for the rotation of idler pulley 530. Support plate 504 is secured to spacer portion 514 with the use of bolts 516 at bolt holes 558 and 196, thereby securing biased pulley 532 between support plate 504 and clamp block 506.

To insert filament tube 508, biased pulley 532 is pulled in a substantially opposite direction from the biasing force of band 534 (i.e., opposite of arrow 538), as represented by arrow 572. Biased pulley 532 is desirably pulled in the direction of arrow 572 until the inner diameter of helicoil 548 aligns with tube holes 190 and 198. Filament tube 568 may then be inserted through tube hole 560 of support plate 504, through helicoil 548 (which is secured within central hole 546 of biased pulley 532), and through tube hole 568 of clamp block 506. Filament tube 508 is desirably inserted until helicoil 548 extends around port 550, and port 550 desirably faces the opposing direction of the biasing force of band 534 (i.e., toward arrow 572). Biased pulley 532 may then be released, which allows band 534 to pull biased pulley 532 back toward spacer portion 514 in the direction of arrow 538. Biased pulley 532 moves in the direction of arrow 538 until helicoil 548 rests against sidewall 520 of filament tube 508, within port 550. As discussed below, the engagement between helicoil 548 and port 550 provides a suitable means for driving filament 24 through filament tube 508 during a build operation.

After filament tube 508 is inserted, tension bolt 518 may then be inserted into tension bolt hole 200, and tightened to reduce the dimensions of slot 542. This secures filament tube 508 within tube hole 568 to substantially prevent filament tube 508 from moving relative to clamp block 506 during the course of operation. Drive mechanism 500 may then be installed into extrusion head 18 (shown in FIG. 1) for use in a build operation.

Figure 14:
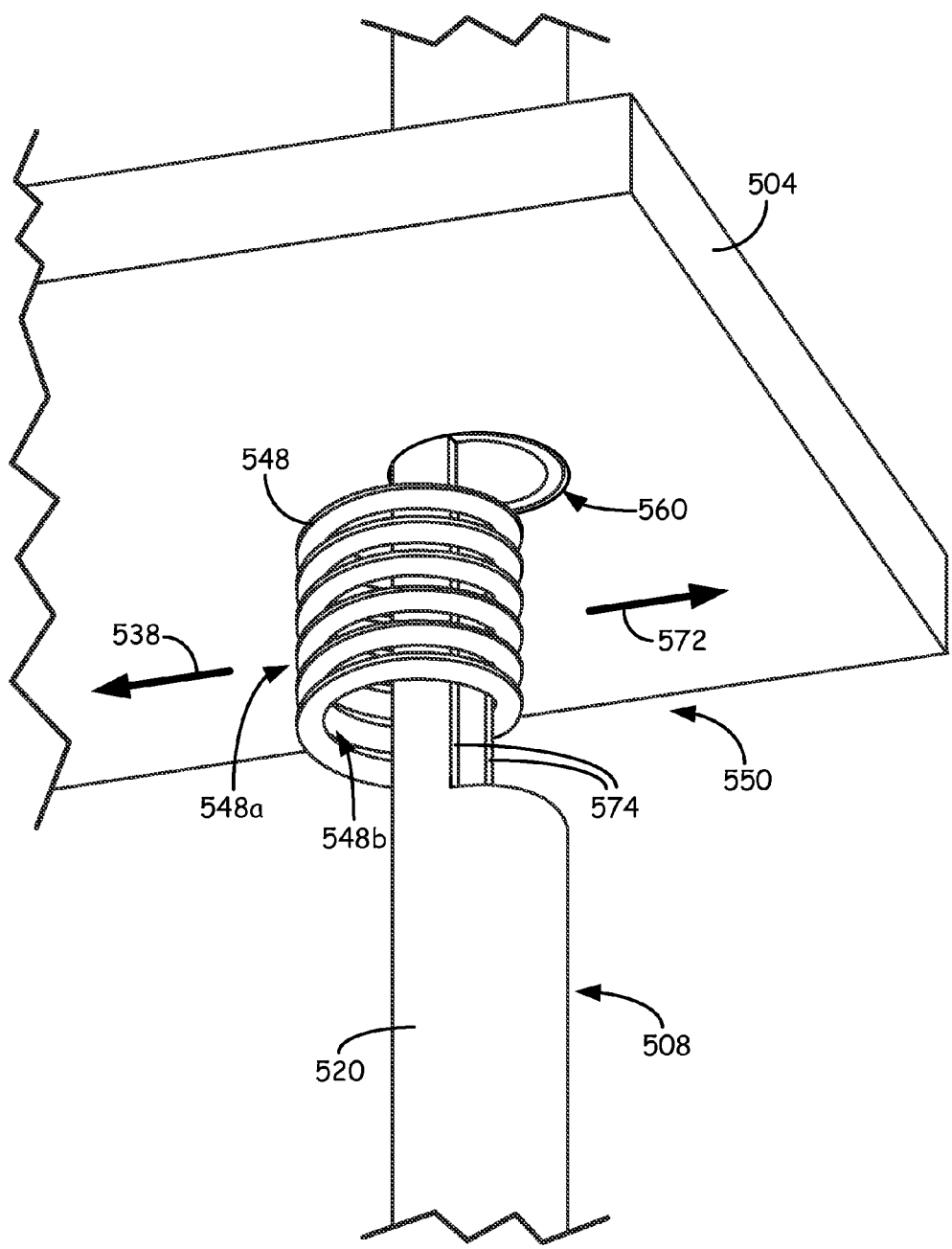
FIG. 14 is an expanded bottom perspective view of an engagement between a helical coil and a filament tube port of the fifth alternative filament drive mechanism.

FIG. 14 is an expanded view of the engagement between helicoil 548 and port 550 after filament tube 508 is inserted through helicoil 548. In the view shown in FIG. 14, clamp block 506, biased pulley 532, and band 534 are omitted for ease of discussion. As shown, sidewall 520 of filament tube 508 includes wall edges 574, which are the edges of sidewall 520 that extend along the longitudinal axis of filament tube 508 at port 550. Helicoil 548 includes outer lands 548a and inner lands 548b, which are respectively the outer diameter surfaces and inner diameter surfaces of the thread segments of helicoil 548. Outer lands 548a are the portions of helicoil 548 secured to biased pulley 532 at central hole 546 (shown in FIG. 13). Thus, the outer diameter of outer lands 548a shown in FIG. 14 represents the location and diameter of central hole 546.

As further shown, helicoil 548 extends around filament tube 508 at port 550, and port 550 faces the opposing direction of the biasing force of band 534 (i.e., toward arrow 572). After filament tube 508 is inserted through biased pulley 532 and helicoil 548, band 534 pulls biased pulley 532 back toward spacer portion 514 in the direction of arrow 538. This moves helicoil 548 in the direction of arrow 538 until inner lands 548b of helicoil 548 rest against wall edges 574 of filament tube 508, within port 550. As a result, a first portion of helicoil 548 is positioned within port 550, and a second portion of helicoil 548 is positioned around the opposing side of sidewall 520 from port 550. At this point, drive mechanism 122 may be installed into extrusion head 18 (shown in FIG. 1), and filament 24 (shown in FIG. 1) may be loaded into filament tube 508.

Figure 15A:
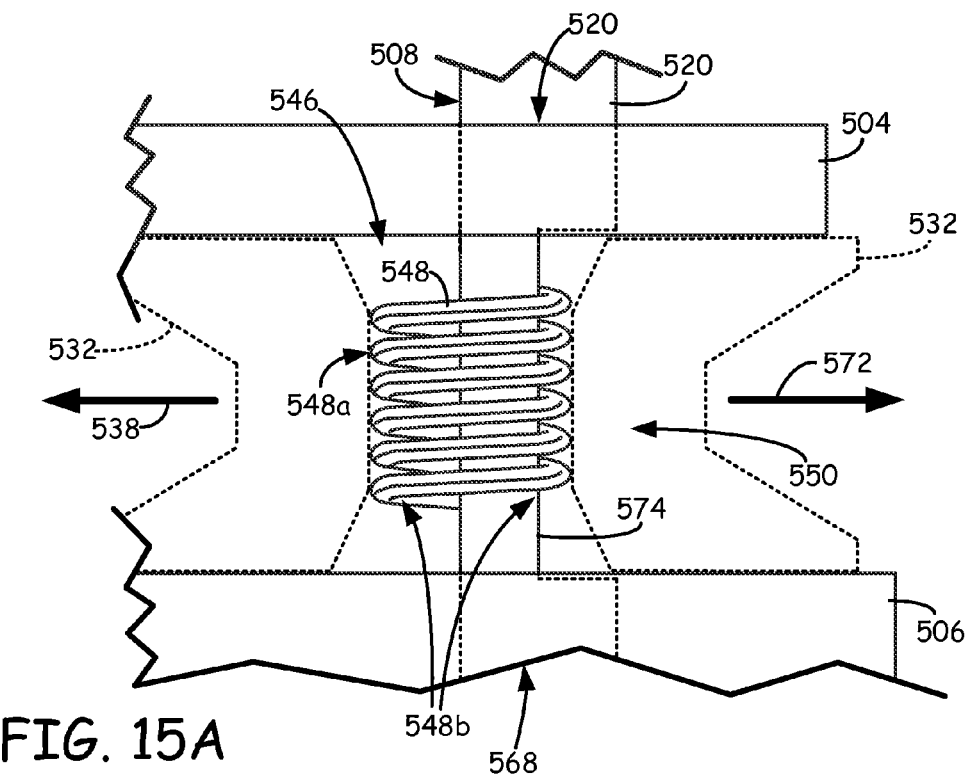
FIGS. 15A-15C are front views of the engagement between the helical coil and the filament tube port of the fifth alternative filament drive mechanism, illustrating the insertion and use of a filament strand.
Figure 15B:
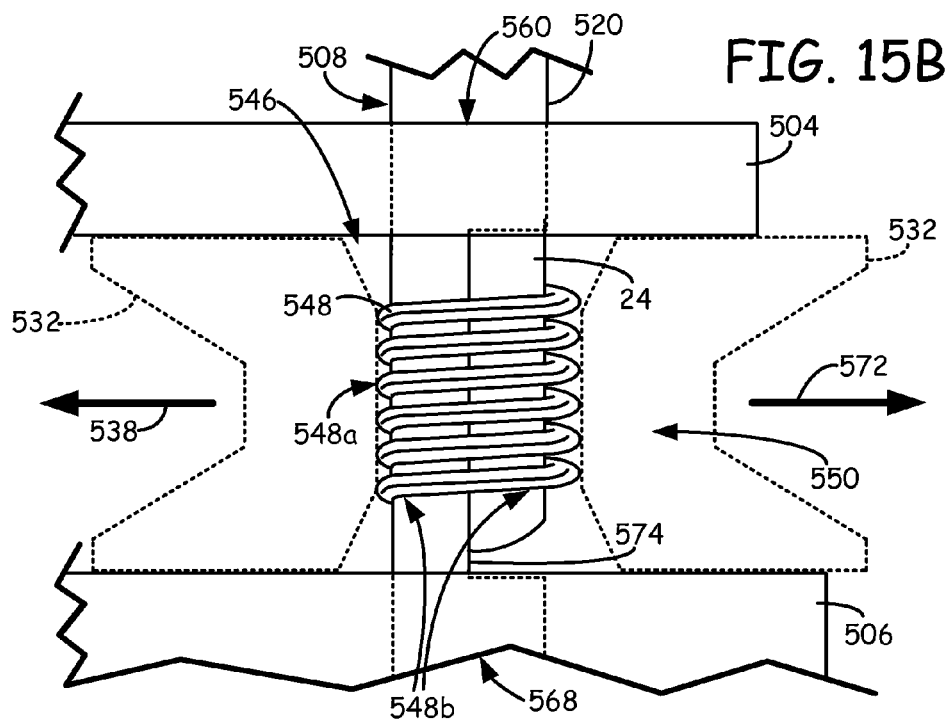
Figure 15C:
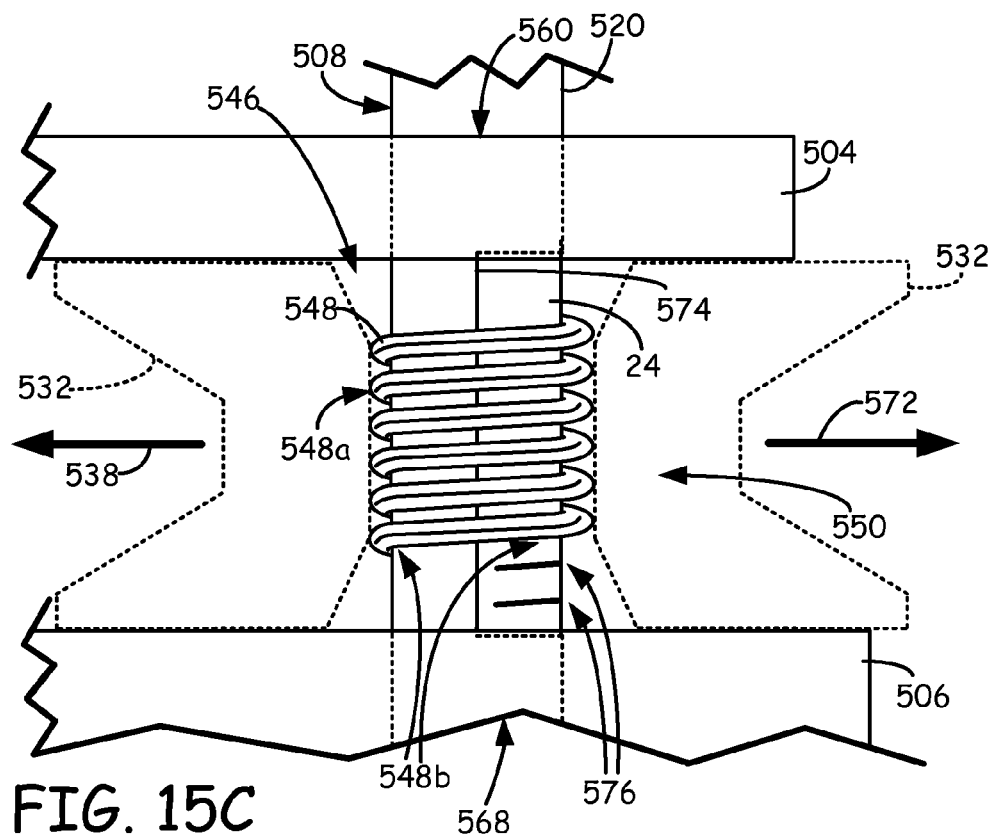

FIGS. 15A-15C are front views of the engagement between helicoil 548 and port 550 of filament tube 508, illustrating the insertion and use of filament 24 (shown in FIG. 1). For ease of discussion, band 534 is omitted in FIGS. 15A-15C, and biased pulley 532 is shown with hidden lines. Furthermore, the sections of filament tube 508 extending through tube holes 560 and 568 are shown with hidden lines to illustrate the location and orientation of port 550.

FIG. 15A shows biased pulley 532 and helicoil 548 in the same arrangement as shown in FIG. 14, where biased pulley 532 is pulled in the direction of arrow 538. At this point, inner lands 548b of helicoil 548 rest on wall edges 574, within port 550, causing helicoil 548 to block filament 24 from passing through filament tube 508. As such, prior to loading filament 24, biased pulley 532 is pulled in the direction of arrow 572, against the biasing force of band 534, until inner lands 548b contact the outer surface of sidewall 520 on the opposing side of sidewall 520 from port 550.

FIG. 15B shows biased pulley 532 and helicoil 548 at a position where inner lands 548b contact the outer surface of sidewall 520, thereby providing a passage for loading filament 24 through filament tube 508. Filament 24 is desirably loaded into filament tube 508 until at least the tip of filament 24 extends below helicoil 548. At this point, biased pulley 532 may be released, which allows biased pulley 532 to be pulled back in the direction of arrow 538. This allows inner lands 548b to engage with filament 24 at port 550.

FIG. 15C shows filament 24 being fed through filament tube 508 by the rotation of helicoil 548. The engagement between filament 24 and inner lands 548b of helicoil 548 allows inner lands 548b to impress grooves 576 in filament 24. As discussed above, the curved orientation of filament 24 prior to entering filament tube 508 reduces the axial rotation of filament 24 while passing through filament tube 508. Additionally, back pressure applied from the molten material in liquefier 30 (shown in FIG. 1) produces torque to counter rotate filament 24, thereby further reducing the axial rotation of filament 24. This allows inner lands 548b to also mate with the formed grooves 576 to impel filament 24 downward through filament tube 508. Thus, the rate of motion of filament 24 through filament tube 508 is controlled by the rotation of biased pulley 532 and helicoil 548. The contact between filament 24 and helicoil 548 also presses filament 24 against sidewall 520 in the direction of arrow 538. As a result, sidewall 520 functions as a support for filament 24 while engaged with inner lands 548b.

The extent that grooves 576 form in filament 24 may vary depending on multiple factors, such as the geometry of inner lands 548b, the thread pitch of helicoil 548, the material of filament 24, and pressure that inner lands 548b apply to filament 24 (due to biased pulley 532 being pulled in the direction of arrow 538 by band 534). In one embodiment, inner lands 548b of helicoil 548 engage with filament 24 with a pressure that thermoplastically forms grooves 576. In this embodiment, inner lands 548b desirably have substantially smooth surfaces to reduce the risk of physically cutting into filament 24. Inner lands 548b may also include low-surface energy coatings to reduce frictional abrasion of filament 24. Suitable coatings for inner lands 548b include those discussed above for interior surface 166 of filament tube 158 (shown in FIG. 6). Extensive amounts of cutting, abrading, and mashing of filament 24 may flex the material of filament 24 past its elastic limits, thereby generating an opaque appearance. In contrast, a thermoplastic formation of grooves 576 reduces the amount of material flexing, which allows filament 24 to retain a substantially translucent appearance. However, as discussed above, the geometries of inner lands 548b may vary depending on the desired contact with filament 24 (e.g., sharp pointed surfaces, smooth rounded surfaces, or variations between these geometries).

Grooves 576 may be thermoplastically formed by engaging inner lands 548b with a contact pressure that is high enough to melt the material of filament 24 at the contact locations while helicoil 548 rotates. For the above-discussed suitable dimensions for filament 24 and helicoil 548, examples of suitable maximum contact pressures between filament 24 and inner lands 548b includes pressures of at least about 14 megapascals (about 2,000 pounds/square-inch), with particularly suitable maximum contact pressures ranging from about 30 megapascals (about 4,000 pounds/square-inch) to about 140 megapascals (about 20,000 pounds/square-inch), and with even more particularly suitable maximum contact pressures ranging from about 70 megapascals (about 10,000 pounds/square-inch) to about 100 megapascals (about 15,000 pounds/square-inch).

The maximum contact pressure is the pressure measured between filament 24 and inner lands 548b when inner lands 548b initially contact filament 24 (prior to the rotation of helicoil 548). At initial contact between filament 24 and inner lands 548b, the contact surface area is low, thereby providing the maximum contact pressure. However, as helicoil 548 rotates, the induced friction between filament 24 and inner lands 548b causes the material of filament 24 to melt at the contact locations, and to reflow and solidify outside of the contact locations. As the rotation of helicoil 548 continues, inner lands 548b continue to deepen the formed grooves 576, which increases the contact surface area between filament 24 and inner lands 548b, and correspondingly reduces the contact pressure. This continues until the contact surface area between filament 24 and inner lands 548b at formed grooves 576 is great enough such that the contact pressure is too low to further melt the material of filament 24. Subsequent inner lands 548b of helicoil 548 then mate with the formed grooves 576 to impel filament 24 downward through filament tube 508 toward liquefier 30 (shown in FIG. 1). This drives filament 24 through filament tube 508 at a drive rate dictated by drive motor 502 (shown in FIGS. 11-13).

As successive portions of filament 24 are driven by the rotation of helicoil 548, additional grooves 576 are formed along filament 24 by inner lands 548b. Thus, as filament 24 exits filament tube 508 at outlet opening 524 (shown in FIGS. 11-13), one side of filament 24 includes grooves 576 spaced apart along the longitudinal length of filament 24. Maintaining a biasing force on helicoil 548 in the direction of arrow 538 also allows the contact between filament 24 and inner lands 548b to be compliant with variations in diameter of filament 24. For example, if the diameter of filament 24 decreases, the bias applied to biased pulley 532 and helicoil 548 causes helicoil 548 to move in the direction of arrow 538 to maintain contact with filament 24. Thus, despite diameter variations in filament 24, helicoil 548 is capable of forming and mating with grooves 576 without substantial changes in the drive rate of filament 24.

Figure 16:
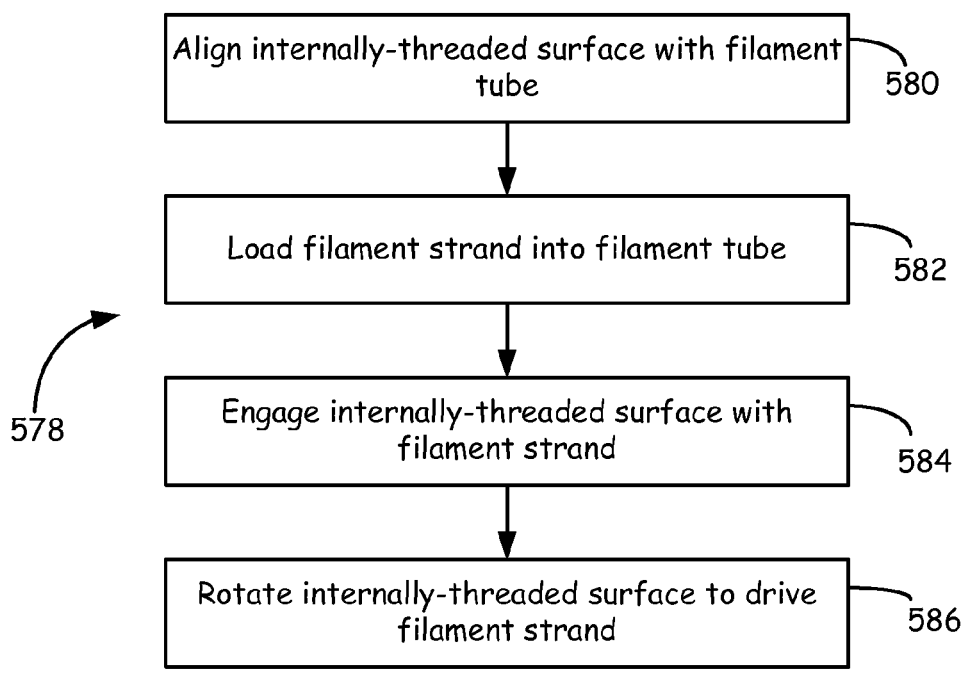
FIG. 16 is a flow diagram of a method for using the fifth alternative filament drive mechanism to build a 3D object.

FIG. 16 is a flow diagram of method 578 for using a biasing drive mechanism (e.g., drive mechanism 500, shown in FIGS. 11-13) to build 3D object 26 (shown in FIG. 1). As shown, method 578 includes steps 580-586, and initially involves substantially aligning the internally-threaded surface of the rotatable component (e.g., helicoil 548) with the inner diameter of the filament tube (e.g., filament tube 508) (step 580). As discussed above, when inner lands 548b of helicoil 548 rest against wall edges 574 of sidewall 520, helicoil 548 blocks the passage of filament 24 through filament tube 508. As such, biased pulley 532 and helicoil 548 may be pulled against the biasing force of band 534 until helicoil 548 is aligned with the inner diameter of filament tube 508. Filament 24 is then loaded into the filament tube at least until the tip of filament 24 extends below the internally-threaded surface (step 582). The internally-threaded surface is then allowed to be pulled back by the biasing force (e.g., the biasing force of band 534) to engage with filament 24 (step 584). The internally-threaded surface is then rotated (e.g., by the rotational power of drive motor 502) to drive successive portions of filament 24 downward through the filament tube toward liquefier 30 (shown in FIG. 1) (step 586). Liquefier then melts the successive portions of the filament 24, and extrudes the molten material in a series of roads to form each layer of 3D object 26.

Although the present invention has been described with reference to preferred embodiments, workers skilled in the art will recognize that changes may be made in form and detail without departing from the spirit and scope of the invention. It is understood that the various features of the above-discussed embodiments for the filament drive mechanism of the present invention may be combined to provide additional alternative embodiments. For example, the alternative rotatable components having internally-threaded surfaces (e.g., rotatable gears, friction-drive rollers, and axially-driven rotatable components), as described above for pulley 36 of drive mechanism 22 (shown in FIGS. 2-4), are also suitable for use in the above-discussed alternative filament drive mechanisms.

What is claimed is:

1. A filament drive mechanism for use in an extrusion-based digital manufacturing system, the filament drive mechanism comprising:
   a rotatable component comprising an axis of rotation and a central hole aligned with the axis of rotation, the central hole being defined at least in part by an internally-threaded surface, wherein the rotatable component is configured to receive a filament strand through the central hole to engage the internally-threaded surface with the filament strand; and
   at least one rotation mechanism configured to rotate the rotatable component around the axis of rotation to drive the filament strand through the central hole of the rotatable component in a direction along the axis of rotation with the engaged internally-threaded surface.

2. The filament drive mechanism of claim 1, wherein the internally-threaded surface comprises a plurality of thread segments that extend at a skewed angle relative to the axis of rotation.

3. The filament drive mechanism of claim 1, wherein the internally-threaded surface comprises a plurality of thread segments that are tapered at an angle up to about 30 degrees.

4. The filament drive mechanism of claim 1, wherein the rotatable component is selected from the group consisting of a rotatable pulley, a rotatable gear, a friction-drive roller, and an axially-driven rotatable component.

5. The filament drive mechanism of claim 1, wherein the rotatable component comprises a rotatable pulley, and wherein the at least one rotation mechanism comprises:
   a fixed-rotational axis pulley;
   a band engaged with the rotatable pulley and the fixed-rotational axis pulley, thereby biasing the rotatable pulley in a first direction; and
   a drive motor configured to engage at least one of the fixed-rotational axis pulley and the band.

6. The filament drive mechanism of claim 1, further comprising a filament tube configured to extend through the central hole of the rotatable component, and further configured to receive the filament strand.

7. The filament drive mechanism of claim 6, further comprising a clamp block having an adjustable slot, wherein the filament tube extends through the clamp block at the adjustable slot.

8. The filament drive mechanism of claim 6, wherein the filament tube comprises a curved portion for receiving the filament strand.

9. A filament drive mechanism for use in an extrusion-based digital manufacturing system, the filament drive assembly comprising:
   a support component configured to be secured to an extrusion head of the extrusion-based digital manufacturing system;
   a first rotatable component retained by the support component with a fixed rotational axis;
   a second rotatable component retained by the support component, and comprising an axis of rotation and a central hole aligned with the axis of rotation, the central hole being defined at least in part by an internally-threaded surface, wherein the second rotatable component is biased in a first direction toward the first rotatable component, the first direction being perpendicular to the axis of rotation; and
   a filament tube configured to receive a filament strand, wherein the filament tube extends through the central hole of the second rotatable component, and comprises a sidewall port disposed adjacent to the internally-threaded surface, and wherein the biasing of the second rotatable component in the first direction is configured to engage the internally-threaded surface with the received filament strand within the sidewall port.

10. The filament drive mechanism of claim 9, wherein the support component comprises:

a base block comprising a spacer portion disposed between the first rotatable component and the second rotatable component; and a support plate secured to the spacer portion of the base block, wherein the first rotatable component and the second rotatable component are disposed between the base block and the support plate.

11. The filament drive mechanism of claim 9, wherein the internally-threaded surface comprises a plurality of inner lands that engage with the received filament strand with a maximum contact pressure of at least about 14 megapascals.

12. The filament drive mechanism of claim 9, wherein the internally-threaded surface comprises a plurality of thread segments that exhibit a geometry selected from the group consisting of skewed angles, a tapered angle relative to the internally-threaded surface, and combinations thereof.

13. The filament drive mechanism of claim 9, further comprising a elastomeric band extending around the first rotatable component and the second rotatable component.

14. The filament drive mechanism of claim 9, wherein the received filament strand has a curved orientation prior to entering the filament tube, the curved orientation having an average angle ranging from about 5 degrees to about 60 degrees as measured between a longitudinal axis of the filament tube and a tangential line to the curved orientation of the received filament strand.

15. A method for building a three-dimensional object with a filament drive mechanism of an extrusion-based digital manufacturing system, the method comprising:

providing a rotatable component of the filament drive mechanism, the rotatable component comprising an axis of rotation and a central hole with the axis of rotation, the central hole being defined at least in part by an internally-threaded surface;

providing a filament tube, wherein the internally-threaded surface is positioned around the filament tube such that the internally-threaded surface is disposed at a sidewall port of the filament tube;

biasing the rotatable component in a first direction that is perpendicular to the axis of rotation to contact the internally-threaded surface with the filament tube at the sidewall port;

biasing the rotatable component in a second direction that is substantially opposite of the first direction, thereby substantially aligning the internally-threaded surface with the filament tube;

loading a filament strand into the filament tube such that the filament strand extends through the central hole of the rotatable component while the rotatable component is biased in the second direction;

removing the bias on the rotatable component in the second direction to move the rotatable component in the first direction to engage the internally-threaded surface with the filament strand; and rotating the rotatable component to drive the filament strand through the filament tube in a direction along the axis of rotation.

16. The method of claim 15, wherein the filament strand is loaded into the filament tube with a curved orientation having an average angle ranging from about 5 degrees to about 60 degrees as measured between a longitudinal axis of the filament tube and a tangential line to the curved orientation of the filament strand.

17. The method of claim 15, wherein the internally-threaded surface engages with the filament strand with a maximum contact pressure of at least about 14 megapascals.

18. The method of claim 15, wherein the rotational component is selected from the group consisting of a rotatable pulley, a rotatable gear, a friction-drive roller, and an axially-driven rotatable component.

19. The method of claim 15, wherein the internally-threaded surface comprises a plurality of thread segments, and wherein rotating the rotatable component to drive the filament strand comprises:

forming grooves in the filament strand with at least a first portion of the plurality of the thread segments; and mating at least a second portion of the plurality of the thread segments with the formed grooves.

20. The method of claim 15, wherein the thread segments extend at a tapered angle relative to the internally-threaded surface, and wherein the grooves are formed in the filament strand over multiple rotations of the rotational component.

* * * * *